US011201651B2

(12) United States Patent
Xu et al.

(10) Patent No.: US 11,201,651 B2
(45) Date of Patent: Dec. 14, 2021

(54) ELECTRONIC APPARATUS AND SERVER IN WIRELESS COMMUNICATION SYSTEM, AND WIRELESS COMMUNICATION METHOD

(71) Applicant: Sony Corporation, Tokyo (JP)

(72) Inventors: Pingping Xu, Jiangsu (CN); Yicheng Xu, Jiangsu (CN); Weiwei Wang, Jiangsu (CN); Pen-shun Lu, Beijing (CN)

(73) Assignee: SONY CORPORATION, Tokyo (JP)

(*) Notice: Subject to any disclaimer, the term of this patent is extended or adjusted under 35 U.S.C. 154(b) by 354 days.

(21) Appl. No.: 16/313,908

(22) PCT Filed: Jul. 10, 2017

(86) PCT No.: PCT/CN2017/092348
§ 371 (c)(1),
(2) Date: Dec. 28, 2018

(87) PCT Pub. No.: WO2018/024080
PCT Pub. Date: Feb. 8, 2018

(65) Prior Publication Data
US 2021/0175943 A1   Jun. 10, 2021

(30) Foreign Application Priority Data

Aug. 3, 2016   (CN) .......................... 201610629121.1

(51) Int. Cl.
*H04B 7/06* (2006.01)
*H04W 76/14* (2018.01)
*H04W 92/18* (2009.01)

(52) U.S. Cl.
CPC .......... *H04B 7/0617* (2013.01); *H04W 76/14* (2018.02); *H04W 92/18* (2013.01)

(58) Field of Classification Search
CPC ..... H04W 76/14; H04W 92/18; H04B 7/0617
(Continued)

(56) References Cited

U.S. PATENT DOCUMENTS

| 10,219,200 B2* | 2/2019 | Yoon ..................... H04W 48/16 |
| 2009/0135064 A1* | 5/2009 | Sim ...................... H04B 7/0617 342/368 |

(Continued)

FOREIGN PATENT DOCUMENTS

| CN | 101427483 A | 5/2009 |
| CN | 102379152 A | 3/2012 |
| CN | 102970256 A | 3/2013 |

OTHER PUBLICATIONS

English translation of International Search Report and Written Opinion for International Application No. PCT/CN2017/092348, dated Aug. 30, 2017.

*Primary Examiner* — Hirdepal Singh
(74) *Attorney, Agent, or Firm* — Xsensus LLP

(57) ABSTRACT

An electronic apparatus is configured to be a transmitting apparatus in D2D communication, and comprises: a transceiver; and one or more processing circuits configured to perform the following operations: enabling, on the basis of the electronic apparatus and position information of a receiving apparatus corresponding to the electronic apparatus, the transceiver to request a server in a wireless communication system for beamforming information; if the electronic apparatus does not receive beamforming information from the server, triggering a beam training process between the electronic apparatus and the receiving apparatus; and after the beam training process is completed, enabling the transceiver to report a result of the beam training process to the server. Employing the electronic apparatus, server, and wireless communication method enables combination of advantages of two beamforming (Continued)

techniques, i.e., adaptive beamforming and predefined codebook beam switching, thus achieving high transmission performance on the basis of a simple algorithm.

16 Claims, 19 Drawing Sheets

(58) Field of Classification Search
USPC .......................................................... 375/267
See application file for complete search history.

(56) References Cited

U.S. PATENT DOCUMENTS

| | | | |
|---|---|---|---|
| 2012/0020420 A1* | 1/2012 | Sakoda | H01Q 3/26 |
| | | | 375/259 |
| 2014/0066113 A1 | 3/2014 | Zhuang et al. | |
| 2014/0206406 A1* | 7/2014 | Cordeiro | H04W 72/046 |
| | | | 455/501 |
| 2017/0195893 A1* | 7/2017 | Lee | H04L 5/006 |
| 2018/0006702 A1* | 1/2018 | Doostnejad | H04B 7/088 |

* cited by examiner

| Tx position \ Rx position | Position 1 | Position 2 | ... | Position N |
|---|---|---|---|---|
| Position 1 | — — | Beamforming information corresponding to a beam from Position 1 to Position 2 | ... | Beamforming information corresponding to a beam from Position 1 to Position N |
| Position 2 | Beamforming information corresponding to a beam from Position 2 to Position 1 | — — | ... | Beamforming information corresponding to a beam from Position 2 to Position N |
| ... | ... | ... | — — | ... |
| Position N | Beamforming information corresponding to a beam from Position N to Position 1 | Beamforming information corresponding to a beam from Position N to Position 2 | ... | — — |

Figure 20

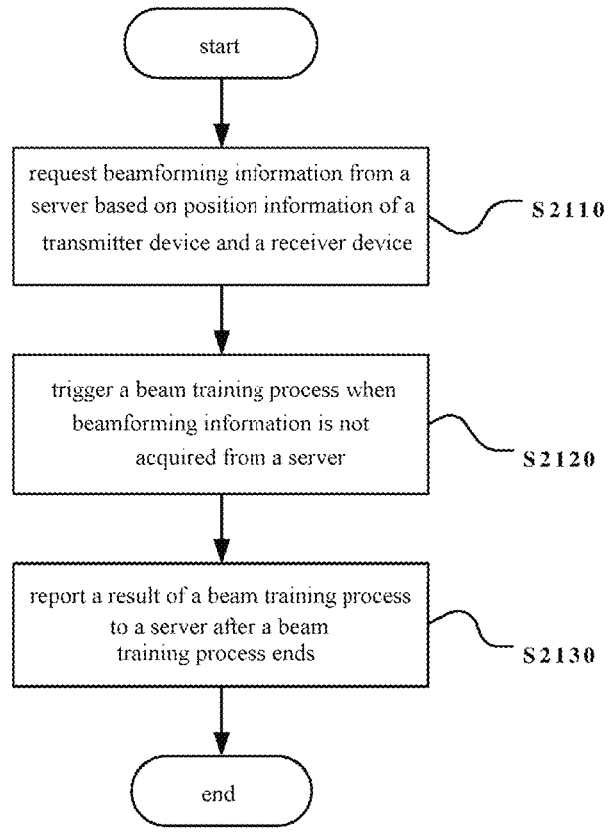

Figure 21

ELECTRONIC APPARATUS AND SERVER IN WIRELESS COMMUNICATION SYSTEM, AND WIRELESS COMMUNICATION METHOD

CROSS-REFERENCE TO RELATED APPLICATIONS

The present application is a National Stage Application based on PCT/CN2017/092348, filed on 10 Jul. 2017, and claims priority to Chinese Patent Application No. 201610629121.1, titled "ELECTRONIC APPARATUS AND SERVER IN WIRELESS COMMUNICATION SYSTEM, AND WIRELESS COMMUNICATION METHOD", filed on Aug. 3, 2016 with the Chinese Patent Office, which is incorporated herein by reference in its entirety.

FIELD

The present disclosure relates to the technical field of wireless communication, and in particular to an electronic apparatus and a server in a wireless communication system and a method for wireless communication in a wireless communication system.

BACKGROUND

This section provides background information related to the present disclosure, which is not necessarily the prior art.

The D2D communication technology refers to an information transmission way in which a user equipment in cellular communication directly performs data interaction through a Device-to-Device way. Compared to the traditional cellular communication, the D2D communication technology multiplexes spectrum resources, has a short transmission distance, and does not forward information through a base station. Therefore, the D2D communication technology can increase spectrum utilization, reduce user equipment transmission power and base station load, and at the same time, due to a small communication distance, so that the signal is better, which helps to reduce communication interference with other devices.

Beamforming is a signal preprocessing technology based on an antenna array. Beamforming produces a directional beam by adjusting weighting coefficients of each element in the antenna array, so that a significant array gain can be obtained. Therefore, beamforming technology has great advantages in terms of expanding coverage, improving edge throughput, suppressing interference and the like. The existing beamforming technology is mostly used for communication between a base station and user equipments within its coverage. Whereas in D2D communication, the terminal exchanges information in a Device-to-Device way, and the traditional beamforming technology no longer satisfies the requirements of D2D communication.

In addition, the existing beamforming algorithms can be mainly divided into a fixed codebook beam switching and an adaptive beamforming. The adaptive beamforming dynamically adjusts transmission and reception beam rotation vectors to obtain a best transmission performance according to a set optimal criteria, however, implementing algorithm has a higher complexity and higher power consumption. The fixed codebook beam switching is that pre-designing a set of beam codebooks, and then selecting the codebook that can maximize a reception signal-to-noise ratio by beam training for communication. Such a scheme typically forms antenna beams with a high sidelobe gain which cannot be effectively suppressed, and it is impossible to form a multi-peak and multi-nulling beam pattern, but it has extremely low implementation complexity, low power consumption, and low hardware cost, so it is suitable for low-cost small devices. In the fixed codebook beam switching technology, it is necessary to perform a beam training operation before user data transmission each time. In some cases where the link needs to be frequently switched, the frequent beam training operation is not only expensive, but also belongs to repeated calculation and a waste of resources.

Therefore, it is necessary to propose a beamforming technology in D2D communication to solve at least one of the above technical problems.

SUMMARY

This section provides a general summary of the present disclosure, and is not a comprehensive disclosure of its full scope or all of its features.

An object of the present disclosure is to provide an electronic device, a server, and a wireless communication method in a wireless communication system, to apply beamforming technology to a transmitter device and a receiver device for D2D communication, and combine the advantages of both beamforming technologies of an adaptive beamforming and a fixed codebook beam switching, and achieve higher transmission performance on the basis of a simple algorithm.

According to an aspect of the present disclosure, there is provided an electronic device in a wireless communication system which serves as a transmitter device for device-to-device D2D communication, the electronic device includes: a transceiver; and one or more processing circuits configured to perform the following operations; causing the transceiver to request beamforming information from a server in the wireless communication system based on position information of the electronic device and a receiver device corresponding to the electronic device; triggering a beam training process between the electronic device and the receiver device when the electronic device does not acquire the beamforming information from the server; and; and causing the transceiver to report a result of the beam training process to the server after the beam training process ends.

According to another aspect of the present disclosure, there is provided an electronic device in a wireless communication system which serves as a receiver device for device-to-device D2D communication, the electronic device includes: a transceiver; and one or more processing circuits configured to perform the following operations: performing a beam training process between the electronic device and a transmitter device corresponding to the electronic device which is triggered by the transmitter device; causing the transceiver to report a result of the beam training process to the server in the wireless communication system after the beam training process ends, wherein the transmitter device requests beamforming information from the server based on position information of the electronic device and the transmitter device, and triggers the beam training process when the transmitter device does not acquire the beamforming information from the server.

According to another aspect of the present disclosure, there is provided a server in a wireless communication system which includes: a transceiver; and one or more processing circuits configured to perform the following operations: causing the transceiver to receive a beamforming information request transmitted by a transmitter device for performing device-to-device D2D communication in the wireless communication system based on position information of the transmitter device and a receiver device corresponding to the transmitter device; searching a beamforming information table based on the position information of the transmitter device and the receiver device; when the beamforming information does not exist in the beamforming information table, causing the transceiver to notify the transmitter device such that the transmitter device triggers a beam training process between the transmitter device and the receiver device; and causing the transceiver to receive a result of the beam training process from the transmitter device and storing it in the beamforming information table.

According to another aspect of the present disclosure, there is provided a wireless communication method performed by a transmitter device for performing device-to-device D2D communication in a wireless communication system, including: requesting beamforming information from a server in the wireless communication system based on position information of the transmitter device and a receiver device corresponding to the transmitter device; triggering a beam training process between the transmitter device and the receiver device when the beamforming information is not acquired from the server; and reporting a result of the beam training process to the server after the beam training process ends.

According to another aspect of the present disclosure, there is provided a wireless communication method performed by a receiver device for performing device-to-device D2D communication in a wireless communication system, including: performing a beam training process between the receiver device and a transmitter device corresponding to the receiver device which is triggered by the transmitter device; and reporting a result of the beam training process to the server in the wireless communication system after the beam training process ends, wherein the transmitter device requests beamforming information from the server based on the position information of the transmitter device and the receiver device, and triggers the beam training process when the transmitter device does not acquire the beamforming information from the server.

According to another aspect of the present disclosure, there is provided a wireless communication method, including: receiving a beamforming information request transmitted by a transmitter device for performing device-to-device D2D communication in a wireless communication system based on position information of the transmitter device and a receiver device corresponding to the transmitter device; searching a beamforming information table based on the position information of the transmitter device and the receiver device; when the beamforming information does not exist in the beamforming information table, notifying the transmitter device such that the transmitter device triggers a beam training process between the transmitter device and the receiver device; and receiving a result of the beam training process from the transmitter device and storing it in the beamforming information table.

Using an electronic device and a server in a wireless communication system and a method for wireless communication in a wireless communication system according to the present disclosure, so that a transmitter device for D2D communication can request beamforming information from the server, perform a beam training process with a receiver device only when the beamforming information is not acquired, and can report the result of the beam training to the server. In this way, the beam training process is not performed before all data transmission, which greatly simplifies the algorithm, and meanwhile, after beam training, the beam with the best transmission performance can be obtained, thereby obtaining higher transmission performance. Therefore, the electronic device and the server in the wireless communication system and the wireless communication method according to the present disclosure can apply the beamforming technology to the transmitter device and the receiver device for D2D communication, and combine the advantages of both beamforming technologies of an adaptive beamforming and a fixed codebook beam switching, and achieve higher transmission performance on the basis of a simple algorithm.

Further applicability areas will become apparent from the description provided herein. The description and specific examples in this summary is only for illustrative purposes and it is nut intended to limit the scope of the present disclosure.

BRIEF DESCRIPTION OF THE DRAWINGS

The drawings described herein are only for illustrative purposes of selected embodiments and are not all possible implementations, and it is not intended to limit the scope of the present disclosure. In the drawing:

FIG. 20 illustrates an example of a beamforming information table according to an embodiment of the present disclosure;

FIG. 21 is a flowchart illustrating a wireless communication method according to an embodiment of the present disclosure;

Figure 1:
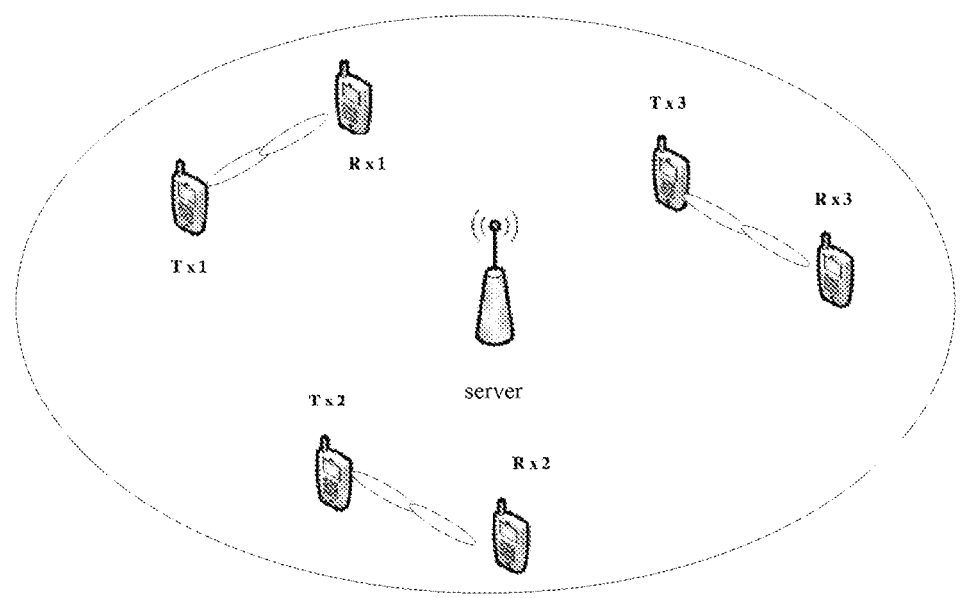
FIG. 1 is a schematic diagram of a scenario of device-to-device D2D communication according to an embodiment of the present disclosure.

While the present disclosure is susceptible to various modifications and alternatives, the specific embodiments thereof have been illustrated in the drawings as examples and described in detail herein. It should be understood, however, that the description of the specific embodiments herein is not intended to limit the present disclosure to the disclosed specific form, but rather, the object of the present disclosure is to cover all of modifications, equivalents and replacements that fall within the spirit and scope of the present disclosure. It is noted that throughout the several figures, corresponding reference numerals indicate corresponding parts.

DETAILED DESCRIPTION OF EMBODIMENTS

Examples of the present disclosure will now be described more fully with reference to the drawings. The description below is merely exemplary in nature and is not intended to limit the present disclosure, application, or use.

The exemplary embodiments are provided so that the present disclosure will become thorough, and will convey the scope thereof fully to those skilled in the art. Examples of numerous specific details, such as specific components, devices, and methods, are set forth to provide a thorough understanding of the embodiments of the present disclosure. It will be apparent to those skilled in the art that exemplary embodiments may be implemented in many different forms without the use of specific details, and they should not be construed as limiting the scope of the present disclosure. In some exemplary embodiments, well-known processes, well-known structures, and well-known technologies are not described in detail.

The transmitter device and the receiver device according to the present disclosure may be a UE (User Equipment) that performs D2D communication. The UE involved in the present disclosure includes, but is not limited to, a terminal having a wireless communication function such as a mobile terminal, a computer, an in-vehicle device, or the like. Further, depending on the specifically described functions, the UE involved in the present disclosure may also be the UE itself or a component thereof such as a chip. Further, similarly, the server involved in the present disclosure may be a base station such as an eNB or a component such as a chip in an eNB. Furthermore, the technical solution of the present disclosure can be used, for example, in an FDD (Frequency Division Duplexing) system and a TDD (Time Division Duplexing) system.

In addition, with the rapid development of the communication technology industry, the demand for ultra-high-speed wireless multimedia applications is growing. The existing microwave frequency band working below 10 GHz can only support an information transmission rate in the order of megabits per second, which has been difficult to meet people's requirements for quality of service of wireless multimedia. In addition, the bandwidth of the microwave band has been exhausted by the existing large number of communication services, the spectrum resources are extremely scarce, and the problem of co-channel interference is serious. However, the spectrum resources of 30-300 GHz millimeter wave band that has not yet been fully developed and utilized are quite abundant, especially the 60 GHz frequency band with continuous unlicensed bandwidth of up to 5-7 GHz. The millimeter-scale wavelength of 60 GHz radio waves makes it possible to configure antenna elements of the same size that are several tens or even hundreds of times more than the microwave frequency band, to guide the super-directionality of radio signals, so the beamforming technology is especially suitable for this frequency band. Accordingly, the wireless communication system to which the present disclosure relates may be a millimeter wave wireless communication system. Further, in the millimeter wave wireless communication system, the operation frequency band is a millimeter wave frequency hand of 30 to 300 GHz. Preferably, the operation frequency band is a millimeter wave frequency band of 60 GHz.

FIG. 1 is a schematic diagram of a scenario of device-to-device D2D communication according to an embodiment of the present disclosure. As shown in FIG. 1, a server is located in a wireless communication system, and there are a plurality of user equipment in the service range of the server: Tx1, Tx2, Tx3, Rx1, Rx2, and Rx3, and these user equipment constitute a plurality of D2D links, wherein the transmitter for D2D link 1 is Tx1, the receiver for D2D link 1 is Rx1; the transmitter for D2D link 2 is Tx2, the receiver for D2D link 2 is Rx2; the transmitter for D2D link 3 is Tx3, and the receiver for D2D link 3 is Rx3, That is, Tx1, Tx2, and Tx3 belong to transmitter devices for D2D communication in the wireless communication system, and Rx1, Rx2, and Rx3 belong to receiver devices for D2D communication in the wireless communication system. In addition, FIG. 1 only illustrates a case where the wireless communication system includes one server, and there are three D2D links within the service range of this server, however, those skilled in the art should understand that there may be a plurality of servers in the wireless communication system, and there may be a plurality of D2D transmitter devices and a plurality of D2D receiver devices within the service range of each of the plurality of servers.

Figure 2:
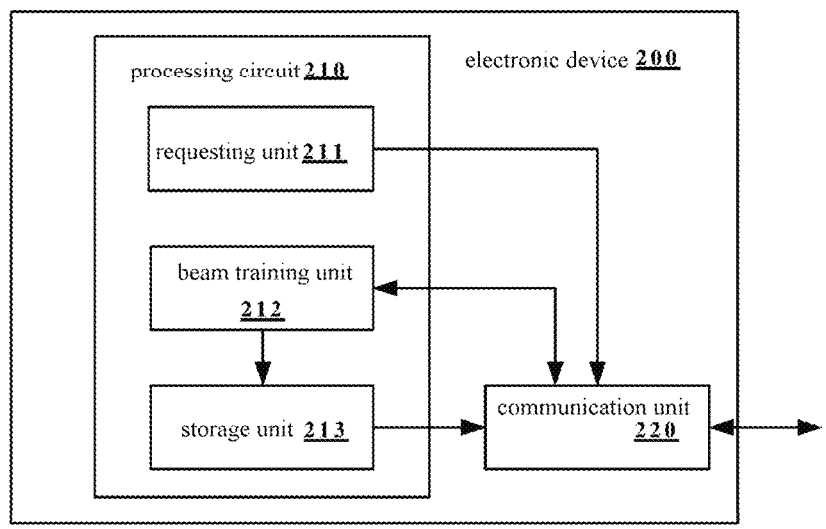
FIG. 2 is a block diagram of a structure of a transmitter electronic device according to an embodiment of the present disclosure.

FIG. 2 is a block diagram of a structure of a transmitter electronic device according to an embodiment of the present disclosure. The transmitter electronic device 200 shown in FIG. 2 may be any one of D2D transmitter devices Tx1, Tx2 or Tx3 shown in FIG. 1.

As shown in FIG. 2, the electronic device 200 may include a processing circuit 210. It should be noted that the electronic device 200 may include one processing circuit 210 or a plurality of processing circuits 210. In addition, the electronic device 200 may further include a communication unit 220 or the like as a transceiver.

Further, the processing circuit 210 may include various discrete functional units to perform various different functions and or operations. It should be noted that these functional units may be physical entities or logical entities, and differently named units may be implemented by the same physical entity.

For example, as shown in FIG. 2, the processing circuit 210 may include a requesting unit 211, a beam training unit 212, and a storage unit 213.

In the electronic device 200 shown in FIG. 2, the requesting unit 211 may cause the communication unit 220 to request beamforming information from a server in the wireless communication system based on the position information of the electronic device 200 and the receiver device corresponding to the electronic device 200.

Here, the receiver device corresponding to the electronic device 200 is a receiver device that is on the same D2D link as the electronic device 200. For example, in the example shown in FIG. 1, Rx1 is a receiver device corresponding to Tx1, Rx2 is a receiver device corresponding to Tx2, and Rx3 is a receiver device corresponding to Tx3. Further, the server may be a server whose service range includes the electronic device 200 and the receiver device corresponding to the electronic device 200. For example, in the example shown in FIG. 1, the requesting unit 211 of the electronic device 200 can cause the communication unit 220 to request beamforming information from the server.

According to an embodiment of the present disclosure, the electronic device 200 may acquire its own position information and position information of the receiver device corresponding to the electronic device 200 according to any method known in the art, and thus may request beamforming information from the server based on the two position information. Further, the electronic device 200 can perform D2D communication with the receiver device corresponding to the electronic device 200 using the beamforming information.

According to an embodiment of the present disclosure, when the electronic device 200 does not acquire beamforming information from the server, the beam training unit 212 may trigger a beam training process between the electronic device 200 and the receiver device.

According to an embodiment of the present disclosure, the electronic device 200 does not acquire the requested beamforming information, which includes multiple cases, for example, the electronic device 200 cannot be connected to the server, the server does not have the beamforming information requested by the electronic device 200, or the server has the beamforming information requested by the electronic device 200 but the corresponding record is damaged, or the like. In the case that the electronic device 200 cannot be connected to the server, the electronic device 200 can determine by itself that the server cannot be connected to thereby trigger the beam training process; in the case that the server does not have the beamforming information requested by the electronic device 200 or the server have the beamforming information requested by the electronic device 200 but the corresponding record is damaged, the beam training unit 212 of the electronic device 200 can determine that the server does not have the beamforming information requested by the electronic device 200 by the notification received from the server via the communication unit 220, to thereby trigger the beam training process. Only three cases in which the electronic device 200 does not acquire the beamforming information are given here. Of course, other cases that the electronic device 200 does not acquire the beamforming information are also included, in which case, the beam training process between the electronic device 200 and the receiver device can be triggered.

According to an embodiment of the present disclosure, the beam training process may employ any beam training process known in the art, which is not limited in the present disclosure. Further, after the beam training process ends, the beam training unit 212 can store the result of the beam training process in the storage unit 213.

According to an embodiment of the present disclosure, the storage unit 213 may store the result of the beam training process, and may cause the communication unit 220 to report the result of the beam training process to the server after the beam training process ends.

The electronic device 200 according to the present disclosure may request the beamforming information from the server, and perform the beam training process with the receiver device only when the beamforming information is not acquired, and may report the result of the beam training to server. In this way, the beam training process is not performed before all data transmission, which greatly simplifies the algorithm, and meanwhile, after beam training, the beam with the best transmission performance can be obtained, thereby obtaining higher transmission performance.

Figure 3:
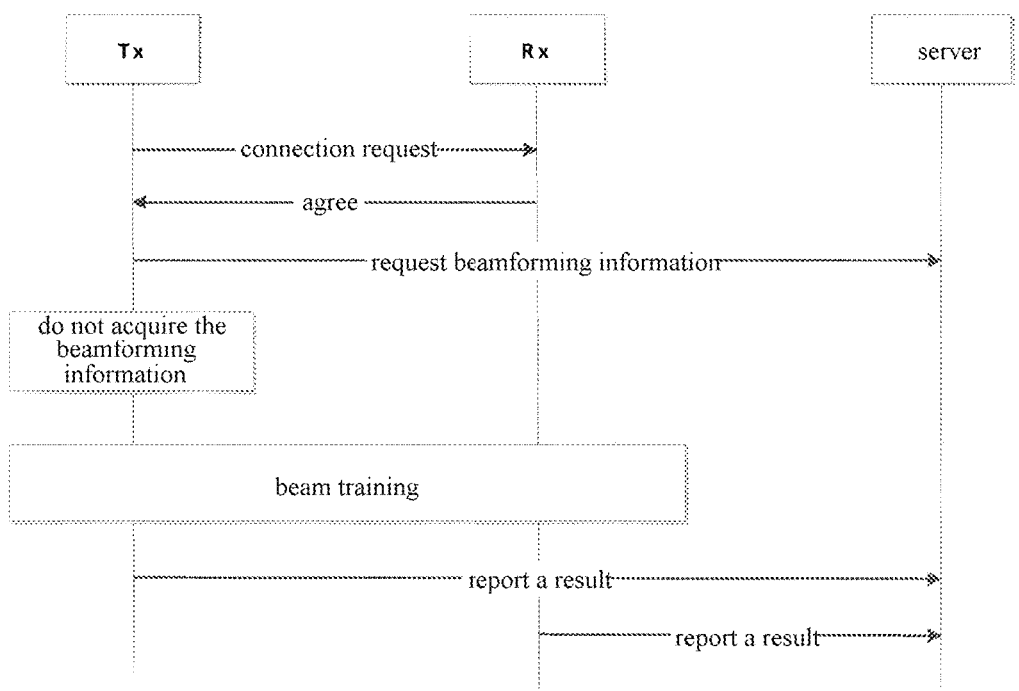
FIG. 3 is a diagram of signaling flow that a transmitter device does not acquire beamforming information according to an embodiment of the present disclosure.

FIG. 3 is a diagram of signaling flow that a transmitter device does not acquire beamforming information according to an embodiment of the present disclosure. The electronic device 200 according to the present disclosure may be the transmitter device Tx shown in FIG. 3, and Rx is the receiver device corresponding thereto. As shown in FIG. 3, when Tx wants to transmit data with Rx, Tx transmits a connection request to Rx. Next, Rx transmits information indicating that the connection is agreed to Tx. According to an embodiment of the present disclosure, Rx may simultaneously transmit its own position information when transmitting information indicating that the connection is agreed to Tx, thereby enabling Tx to know the position information of Rx. Next, Tx requests beamforming information from the server based on the position information of Tx and Rx. Next, Tx determines that the requested beamforming information has not been acquired from the server, thereby performing a beam training process with Rx. Next, after the beam training process ends, Tx reports the results of the beam training to the server.

Requesting Unit 211

According to an embodiment of the present disclosure, the requesting unit 211 may transmit request information to the server to request beamforming information. Wherein the request information may include both position information of the electronic device 200 and position information of the receiver device.

According to an embodiment of the present disclosure, the beamforming information requested by the requesting unit 211 is the beamforming information corresponding to both the position information of the electronic device 200 and the position information of the receiver corresponding to the electronic device 200. In other words, multiple beamforming information can be saved on the server side, and each beamforming information is associated with two position information. The requesting unit 211 transmits a request to the server using both the position information of the electronic device 200 and the position information of the receiver device as parameters, to request beamforming information corresponding to the two position information.

It should be noted that the position information described in the present disclosure may be absolute position information, or may be relative position information with respect to the server, as long as it is consistent on the server side and the electronic device 200 and the receiver device side.

Beam Training Unit 212

According to an embodiment of the present disclosure, when performing a beam training process, the beam training unit 212 is further configured to perform the following operations: causing the communication unit 220 to transmit a training sequence to the receiver device; causing the communication unit 220 to receive the training sequence transmitted from the receiver device after the training sequence is transmitted to the receiver device each time; and storing a beam obtained from the training, and causing the communication unit 220 to transmit a training sequence to the receiver device using the stored beam after the training sequence transmitted from the receiver device is received each time.

According to an embodiment of the present disclosure, when performing a beam training process, the electronic device 200 and the receiver device corresponding to the electronic device 200 sequentially transmit a training sequence. A training sequence is transmitted using the latest stored beam each time. After the training sequence is transmitted each time, it waits for the training sequence transmitted by the other party. After the training sequence transmitted by the other party is received each time, the beam obtained from training is stored.

Figure 4:
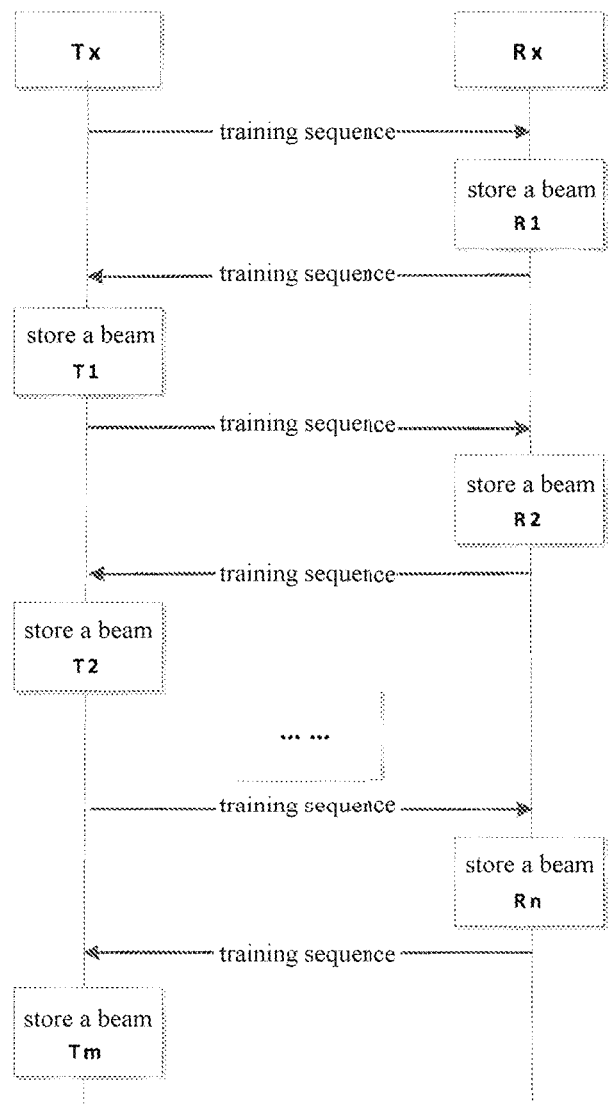
FIG. 4 is a diagram of signaling flow for a beam training process according to an embodiment of the present disclosure.

FIG. 4 is a diagram of signaling flow for a beam training process according to an embodiment of the present disclosure. The electronic device 200 according to the present disclosure may be the transmitter device Tx shown in FIG. 4, and Rx may be a receiver device corresponding to the electronic device 200. As shown in FIG. 4, the transmitter device Tx transmits a training sequence to the receiver device Rx. Here, since it is the first transmission after the beam training starts, Tx can transmit the training sequence to Rx using an omnidirectional antenna. In the present disclosure, the training sequence can be designed using any algorithm known in the art, which is not limited in this disclosure. Next, after Rx receives the training sequence transmitted by Tx, the training sequence is used to train the beam, thereby acquiring the trained beam R1, and storing the beam R1. Next, Rx transmits the training sequence to Tx using the stored beam R1. Next, after Tx receives the training sequence transmitted by Rx, the training sequence is used to train the beam, thereby acquiring the trained beam T1, and storing the beam T1. The whole beam training process is performed in a similar process. Tx uses the stored beam T1 to transmit a training sequence to Rx, Rx uses the stored beam R2 to transmit a training sequence to Tx, . . . , Rx uses the stored beam Rn to transmit a training sequence to Tx, and Tx uses the training sequence to train the beam, thereby acquiring the trained beam Tm and storing the beam Tm. Then the beam training process ends. In this beam training process, the transmitter device Tx stores m beams T1-Tm, and the receiver device Rx stores n beams R1-Rn. Here, both in and a are positive integers, and the relationship between m and n depends on the number of times a training sequence is transmitted. When the total number that Tx and Rx transmit training sequences is an even number, m=n; when the total number that Tx and Rx transmit training sequences is an odd number, m=n−1.

According to an embodiment of the present disclosure, when performing a beam training process, the beam training unit 212 is further configured to perform the following operations: setting a predetermined threshold with respect to the number of times, when the total number that the electronic device 200 and the receiver device corresponding to the electronic device 200 transmit training sequences reaches this predetermined threshold, the beam training process ends.

According to an embodiment of the present disclosure, this predetermined threshold with respect to the number of times may be set according to actual experience, thereby setting an end condition of the beam training process. Preferably, the predetermined threshold with respect to the number of times is 4 or 5.

According to an embodiment of the present disclosure, when performing a beam training process, the beam training unit 212 is further configured to perform the following operations: ending the beam training process when the beam obtained by the last training meets a predetermined requirement. Specifically, when both the phase and the energy amplitude of the beam obtained by the last training meet the predetermined requirement, it is determined that the beam training process ends.

The two conditions at which the beam training process ends are given above, however, the present disclosure is not limited thereto, and other similar methods may be employed to define the conditions at which the beam training process ends.

As described above, according to an embodiment of the present disclosure, Tx and Rx sequentially transmit a beam training sequence, and each time a training sequence is received, the beam can be trained once. This process is a gradual convergence process, so that the beam is gradually corrected. When the beam training ends, the beams of Tx and Rx are both corrected towards each other for subsequent beamforming and data transmission operations. At the same time, the beam training process with the receiver device is performed only when the beamforming information is not acquired, which greatly simplifies the algorithm. Further, the beam training process is also an adaptive adjustment process, so that the beam with the best transmission performance can be obtained, and higher transmission performance can be obtained. Therefore, the advantages of both beamforming technologies of an adaptive beamforming and a fixed codebook beam switching are combined, and higher transmission performance is achieved on the basis of a simple algorithm.

In the example shown in FIG. 4, an example in which only the training sequence is transmitted between Tx and Rx is shown. According to an embodiment of the present disclosure, when causing the communication unit 220 to transmit the training sequence to the receiver device using the stored beam, the beam training unit 212 is further configured to perform the following operation: causing the communication unit 220 to transmit a training sequence and data together to the receiver device using the stored beam.

According to an embodiment of the present disclosure, each time Tx or Rx transmits a training sequence, data may be simultaneously transmitted, where the data may be part of data that Tx desires to transmit to Rx. Further, each time the training sequence and data are transmitted, they are transmitted using the newly stored beam. In this way, a portion of the data cat be transmitted using the trained beam without waiting for the end of the beam training process. In this case, although the trained beam is not the beam with a best performance and a most accurate directionality, the waiting time for data transmission can be greatly reduced. According to an embodiment of the present disclosure, after the beam training process ends, the electronic device 200 may continue to transmit data that has not been transmitted during beam training process to the receiver device corresponding to the electronic device 200.

According to an embodiment of the present disclosure, when causing the communication unit 220 to transmit the training sequence and data together to the receiver device, the beam training unit 212 is further configured to perform the following operation: making the training sequence follow the data to transmit together or making the data follow the training sequence to transmit together.

Figure 5:
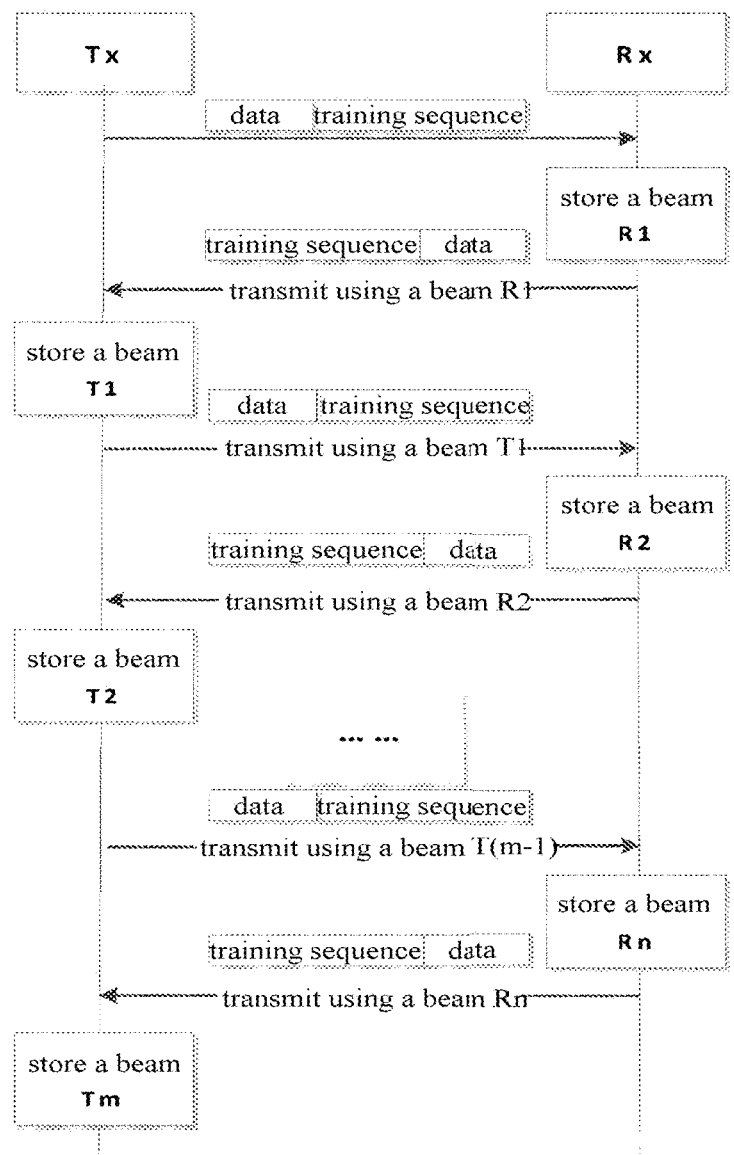
FIG. 5 is a diagram of signaling flow for a beam training process according to another embodiment of the present disclosure.
Figure 6:
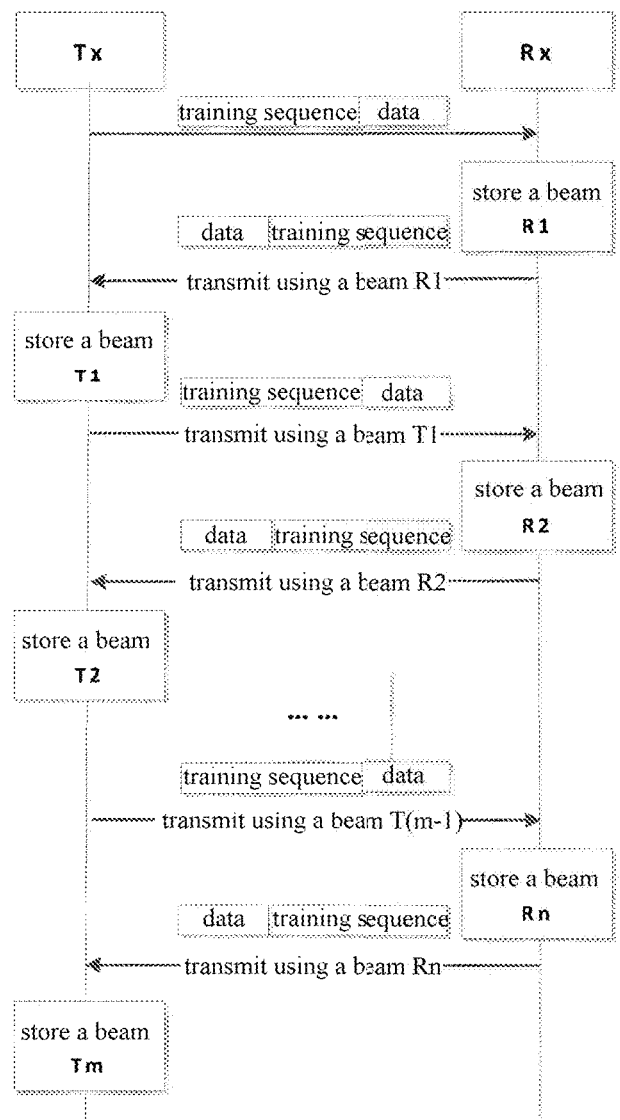
FIG. 6 is a diagram of signaling flow for a beam training process according to yet another embodiment of the present disclosure.

The above two ways will be described in detail below with reference to FIG. 5 and FIG. 6. FIG. 5 is a diagram of signaling flow for a beam training process according to yet another embodiment of the present disclosure. FIG. 6 is a diagram of signaling flow for a beam training process according to another embodiment of the present disclosure.

As shown in FIG. 5, the electronic device 200 make the data follow the training sequence to transmit together. In the direction indicated by the arrow, the electronic device 200 as a transmitter device Tx first transmits a training sequence, and then transmits data, to the receiver device Rx at each transmission, and the receiver device Rx also first transmits a training sequence, and then transmits data, to the transmitter device Tx at each transmission. Specifically, at the first transmission after the beam training is started, Tx may use an omnidirectional antenna to transmit a training sequence and data to Rx. Next, after Rx receives the training sequence transmitted by Tx, the training sequence is used to train a beam, thereby acquiring the trained beam R1 and storing the beam R1. Next, Rx transmits a training sequence and data to Tx using the stored beam R1. Next, after Tx receives the training sequence and data transmitted by Rx, the training sequence is used to train the beam, thereby acquiring the trained beam T1 and storing the beam T1. The whole beam training process is performed in a similar process. Tx transmits a training sequence and data to Rx using the stored beam T1, Rx transmits a training sequence and data to Tx using the stored beam R2, . . . , Rx transmits a training sequence and data to Tx using the stored beam Rn, and Tx uses the training sequence to train a beam, thereby acquiring the trained beam Tm and storing the beam Tm. Then the beam training process ends.

As shown in FIG. 6, the electronic device 200 makes the training sequence follow the data to transmit together. In the direction indicated by the arrow, the electronic device 200, which is the transmitter device Tx, first transmits data, and then transmits a training sequence, to the receiver device Rx at each transmission, the receiver device Rx also first transmits data, and then transmits a training sequence, to the transmitter device Tx at each transmission. This process is similar to that of FIG. 5 and will not be described again here.

In the embodiments shown in FIGS. 5 and 6, although the beams T1-T(m−1) are still not the beams with a best performance and a most accurate directionality, Tx can still use them to transmit data to Rx, so that the beam training process can be performed simultaneously with the data transmission process, which can greatly reduce the waiting time for data transmission.

Storage Unit 213

It is worth noting that in the existing beam training process, only the beam obtained from the last training is stored and this beam is used to perform beamforming and data transmission. In the embodiment of the present disclosure, the storage unit 213 of the electronic device 200 may store all the beams trained in the beam training process, including the beam obtained by the last training and the beams obtained by the intermediate process training. Correspondingly, the receiver device corresponding to the electronic device 200 may also stores all the beams trained in the beam training. In other words, according to an embodiment of the present disclosure, both the electronic device 200 and the receiver device corresponding to the electronic device 200 can store the "final value" and "intermediate values" of the beam training process.

According to an embodiment of the present disclosure, the storage unit 213 is further configured to perform the following operation: taking the last stored beam as an optimal beam and taking other stored beams as sub-optimal beams. In addition, there may be one or more sub-optimal beams.

For example, in the example shown in FIGS. 4-6, the electronic device 200 stores the beam Tm as an optimal beam and the other beams T1-T(m−1) as sub-optimal beams. Similarly, the receiver device stores the beam Rn as an optimal beam and the other beams R1-R(n−1) as sub-optimal beams.

According to an embodiment of the present disclosure, the storage unit 213 is further configured to perform the following operations: priority levels of the one or more sub-optimal beams may be simultaneously stored when the optimal beam and the one or more sub-optimal beams are stored. Specifically, the storage unit 213 may perform the following operations to set the priority levels of sub-optimal beams, such that in the beam training process, the priority level of the beam obtained earlier is lower than the priority level of the beam obtained later.

As shown in FIGS. 4-6, in the beam training process, the electronic device 200 sequentially obtains beams T1, T2, . . . , T(m−1), Tm, where the beams T1, T2, . . . , T(m−1) belong to the sub-optimal beams, so the priority levels are: T1<T2< . . . <T (m−1). The storage unit 213 also stores the priority levels of the beams T1, T2, . . . , T(m−1) while storing the beams.

According to an embodiment of the present disclosure, when causing the communication unit 220 to report the result of the beam training process to the server, the storage unit 213 is further configured to perform the following operation: causing the communication unit 220 to report all the stored beams to the server. That is, the result of the beam training process includes all of the beams stored by the electronic device 200.

For example, in the example shown in FIGS. 4-6, the electronic device 200 reports the stored beam T1, beam T2, . . . , beam Tm to the server.

According to an embodiment of the present disclosure, the processing circuit 210 is further configured to report the position information of the electronic device 200 and the position information of the receiver device corresponding to the electronic device 200 to the server when reporting the result of the beam training. In this way, the server can associate the position information of the electronic device 200 and the position information of the receiver device with the result of the beam training. When there is another transmitter device that requests beamforming information from the server based on the same position information as the two position information, the server can return the result of this beam training. Although the requesting unit 211 has reported the position information of the electronic device 200 and the receiver device when transmitting the beamforming information request, the two position information may be reported again when reporting the result of the beam training, so that the reported position information is more accurate.

According to an embodiment of the present disclosure, when reporting the result of the beam training, the processing circuit 210 may be further configured to: report the position information of the electronic device 200 to the server, while the position information of the receiver device may be reported by the receiver device itself.

According to an embodiment of the present disclosure, the processing circuit 210 is further configured to report the channel quality condition between the electronic device 200 and the receiver device corresponding to the electronic device 200 to the server. That is, the result of the beam training process includes the channel quality condition between the electronic device 200 and the receiver device corresponding to the electronic device 200. Channel quality conditions herein include, but are not limited to, signal to noise ratio, signal to interference ratio, and signal to interference and noise ratio.

According to an embodiment of the present disclosure, the processing circuit 210 is further configured to report the time when each beam is stored to the server along with the beam. That is to say, the result of the beam training process also includes the time when a beam is stored.

In addition, the processing circuit 210 may also report other types of information related to the electronic device 200 and the receiver device corresponding to the electronic device 200 according to actual needs.

Figure 7:
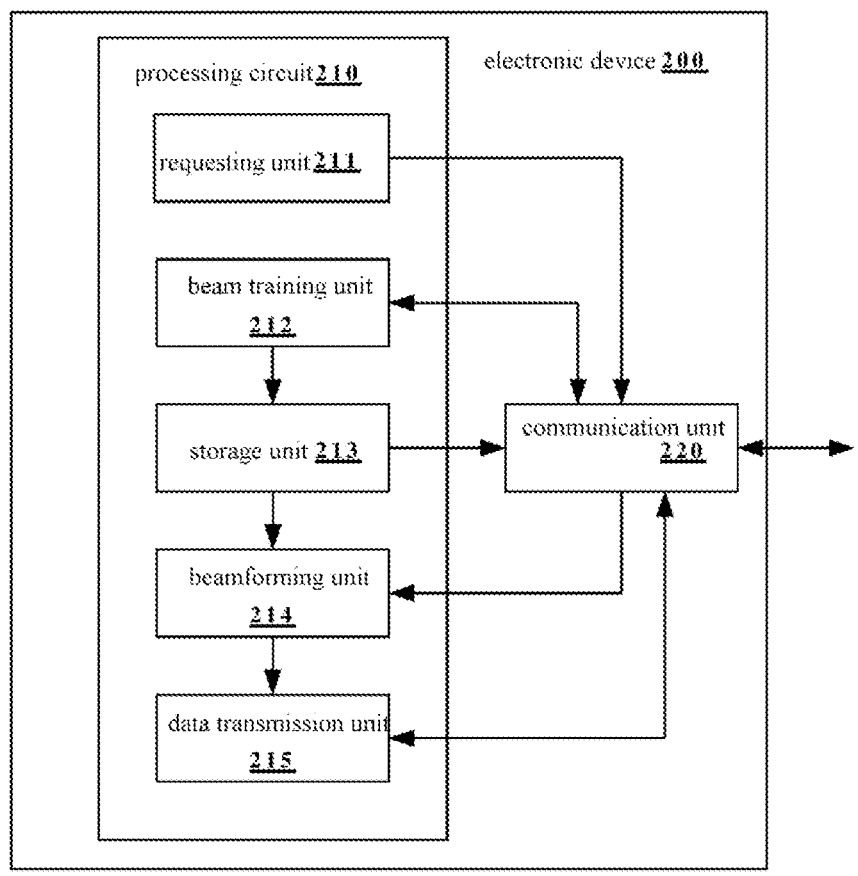
FIG. 7 is a block diagram of a structure of a transmitter electronic device according to yet another embodiment of the present disclosure.

An electronic device 200 according to yet another embodiment of the present disclosure will be described below with reference to FIG. 7. FIG. 7 is a block diagram of a structure of a transmitter electronic device according to yet another embodiment of the present disclosure.

As shown in FIG. 7, the electronic device 200 can include a processing circuit 210. It should be noted that the electronic device 200 may include one processing circuit 210 or a plurality of processing circuits 210. In addition, the electronic device 200 may further include a communication unit 220 or the like as a transceiver.

Further, the processing circuit 210 may include various discrete functional units to perform various different functions and/or operations. It should be noted that these functional units may be physical entities or logical entities, and differently named units may be implemented by the same physical entity.

For example, as shown in FIG. 7, the processing circuit 210 may include a requesting unit 211, a beam training unit 212, a storage unit 213, a beamforming unit 214, and a data transmission unit 215. The requesting unit 211, the beam training unit 212, and the storage unit 213 herein may employ the requesting unit 211, the beam training unit 212, and the storage unit 213 shown in FIG. 2, and the functions thereof may also be the same as the respective units shown in FIG. 2, and thus it will not be described here.

According to an embodiment of the present disclosure, the beamforming unit 214 may perform a beamforming process according to a result of a beam training process. That is, when the electronic device 200 does not acquire the requested beamforming information from the server, a beam training process can be performed, thereby enabling the beamforming unit 214 to perform a beamforming process according to the result of the beam training process.

According to an embodiment of the present disclosure, the data transmission unit 215 may perform data transmission with the receiver device according to the result of the beamforming process.

Figure 8:
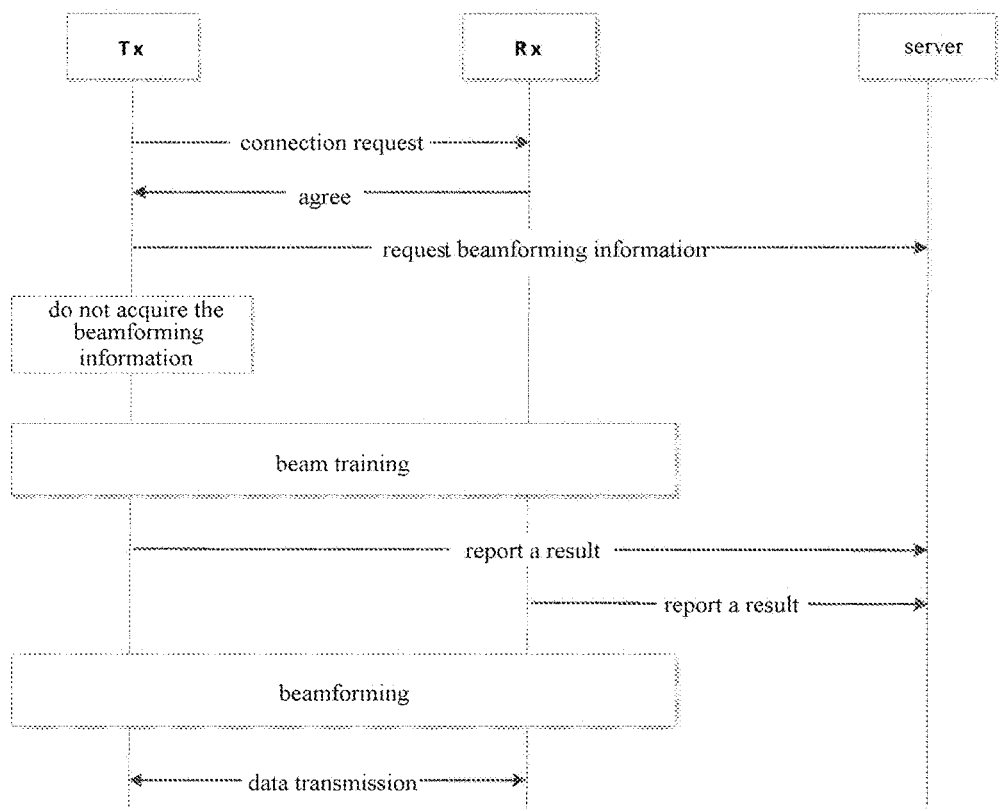
FIG. 8 is a diagram of signaling flowchart that a transmitter device does not acquire beamforming information according to yet another embodiment of the present disclosure.

FIG. 8 is a diagram of signaling flow that a transmitter device does not acquire beamforming information according to yet another embodiment of the present disclosure. Most of the signaling flow shown in FIG. 8 is the same as the signaling flow shown in FIG. 3, and it is not described herein again. As shown in FIG. 8, after Tx reports the result of beam training to the server, both Tx and Rx perform a beamforming process. Next, after the beamforming ends, Tx and Rx perform data transmission.

According to an embodiment of the present disclosure, when the electronic device 200 acquires beamforming information from the server, the beamforming unit 214 may also perform a beamforming process according to the acquired beamforming information. The data transmission unit 215 can also perform data transmission with the receiver device according to the result of the beamforming process.

Figure 9:
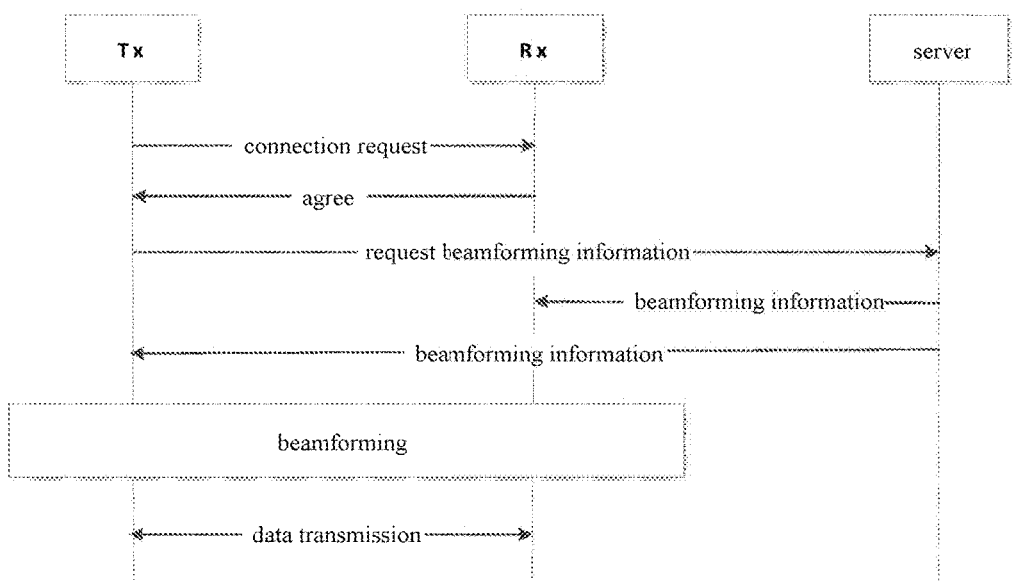
FIG. 9 is a diagram of signaling flow that a transmitter device acquires beamforming information according to an embodiment of the present disclosure.

FIG. 9 is a diagram of signaling flow that a transmitter device acquires beamforming information according to an embodiment of the present disclosure. As shown in FIG. 9, when Tx wants to perform data transmission with Rx, Tx transmits a connection request to Rx. Next, Rx transmits information indicating that the connection is agreed to Tx. According to an embodiment of the present disclosure, Rx may simultaneously transmit its own position information when transmitting information indicating that the connection is agreed to Tx, thereby enabling Tx to know the position information of Rx. Next, Tx requests beamforming information from the server based on the position information of Tx and Rx. Next, the server returns beamforming information to Tx and Rx. Next, both Tx and Rx perform beamforming processes based on beamforming information received from the server. Next, after the beamforming ends, Tx and Rx perform data transmission.

According to an embodiment of the present disclosure, the beamforming information acquired by the electronic device 200 from the server includes beam information required for the electronic device 200 and the receiver device corresponding to the electronic device 200 to perform data transmission. Further, the beamforming information may further include an optimal beam and one or more sub-optimal beams required for the electronic device 200 and the receiver device corresponding to the electronic device 200 to perform data transmission.

According to an embodiment of the present disclosure, after the electronic device 200 reports the result of the beam training process to the server, the server may store the result of this beam training as the beamforming information corresponding to the position information of the electronic device 200 and the positon information of the receiver device corresponding to the electronic device 200.

As mentioned in the foregoing, the beamforming information requested by the electronic device 200 from the server is the beamforming information corresponding to both the position information of the electronic device 200 and the position information of the receiver device corresponding to the electronic device 200. That is, if the electronic device 200 can acquire the requested beamforming information from the server, it indicates that before the electronic device 200 desires to perform data transmission with the receiver device, there is a transmitter device at the position of the electronic device 200, and there is a receiver device at the position of the receiver device corresponding to the electronic device 200, and the transmitter device existing before this transmission performed a beam training process with the receiver device existing before this transmission, thereby reporting the result of the beam training process to the server. Therefore, when the electronic device 200 performs data transmission this time, the result of the beam training process previously performed at the same position can be directly utilized, thereby eliminating the current beam training process.

According to an embodiment of the present disclosure, when the electronic device 200 acquires beamforming information from a server, this beamforming information is directly used to perform a beamforming process, thereby eliminating the beam training process and reducing the number of the beam trainings and increasing the efficiency of communication.

Beamforming Unit 214

According to an embodiment of the present disclosure, the beamforming process performed by the beamforming unit 214 includes a beam selecting process. In the case that the electronic device 200 does not acquire beamforming information from the server, the beamforming process is performed according to the result of the beam training process, and the beam training process may generate an optimal beam and one or more sub-optimal beams; whereas in the case that the electronic device 200 acquires beamforming information from the server, the beamforming process is performed according to the beamforming information, and the acquired beamforming information may also include an optimal beam and one or more sub-optimal beams. Therefore, the beam selecting process includes: selecting one beam from the optimal beam and one or more sub-optimal beams.

According to an embodiment of the present disclosure, when performing a beamforming process, the beamforming unit 214 is further configured to select an optimal beam to perform a beamforming process. According to an embodiment of the present disclosure, by default, the beamforming unit 214 may always select the optimal beam to perform the beamforming process. Of course, the beam selecting rule can also be set according to actual needs, so that the beam for beamforming is selected according to the beam selecting rule.

Figure 10:
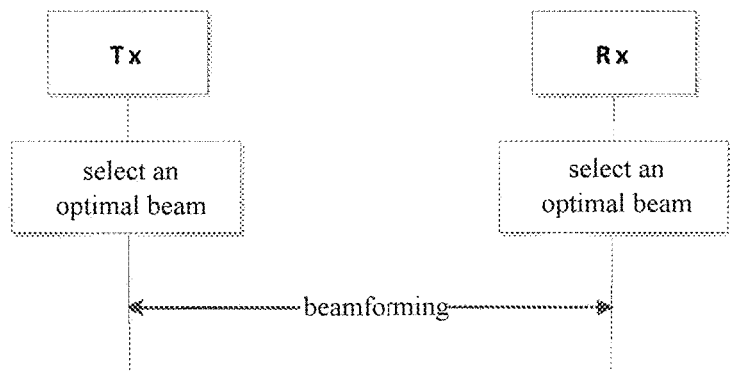
FIG. 10 is a diagram of signaling flow for a beamforming process according to an embodiment of the present disclosure.

FIG. 10 is a diagram of signaling flow for a beamforming process according to an embodiment of the present disclosure. As shown in FIG. 10, after the beamforming process starts, Tx selects the optimal beam from the optimal beam and one or more sub-optimal beams of Tx, and Rx also selects the optimal beam from the optimal beam and one or more sub-optimal beams of Rx. Next, both Tx and Rx perform beamforming using their respective optimal beams. Here, the process of performing beamforming using a known beam is common knowledge in the art, which is not limited in the present disclosure.

The default case of selecting the optimal beam to perform the beamforming process is described above. However it may occur in the actual scenario that the direct path between the transmitter device and the receiver device is blocked, while the optimal beam is precisely the beam of the transmitter device and the receiver device relative to each other, and the energy is relatively concentrated, so that the data between the transmitter device and the receiver device will be seriously lost in the case where the direct path is blocked. At this time, since the sub-optimal beam is more divergent with respect to the optimal beam, if the sub-optimal beam can be switched to an optimal beam, the data loss situation can be improved.

According to an embodiment of the present disclosure the processing circuit 210 is further configured to perform the following operations: determining that a direct path between the electronic device 200 and the receiver device is blocked; selecting a sub-optimal beam to re-perform the beamforming process; causing the communication unit 220 to transmit a beam change request to the receiver device to request the receiver device to select the sub-optimal beam to re-perform the beamforming process; and performing data transmission with the receiver device according to the result of the re-performed beamforming process.

Figure 11:
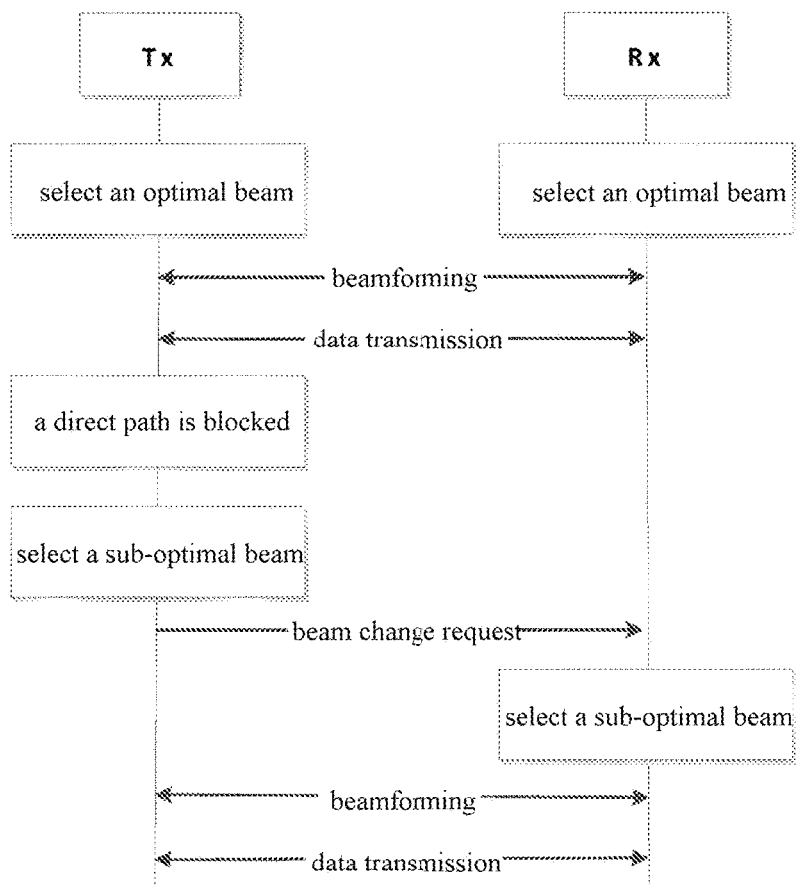
FIG. 11 is a diagram of signaling flow that a transmitter device reselects a beam when it finds that a direct path is blocked according to an embodiment of the present disclosure.

FIG. 11 is a diagram of signaling flow for reselecting a beam in the case that the transmitter device finds that the direct path is blocked according to an embodiment of the present disclosure. As shown in FIG. 11, in the process of performing data transmission via the optimal beam between Tx and Rx, if Tx finds that the direct path is blocked, then the sub-optimal beam is selected and a beam change request is transmitted to Rx. Next, Rx selects the sub-optimal beam. Next, Tx and Rx re-perform beamforming via the sub-optimal beam and perform data transmission.

According to an embodiment of the present disclosure, the electronic device 200 (e.g., a determination unit, not shown) may determine that a direct path between the electronic device 200 and the receiver device is blocked. For example, when the channel quality between the electronic device 200 and the receiver device suddenly drops, for example, the difference between the channel quality parameters per unit time is greater than a certain threshold, the electronic device 200 determines the direct path between the electronic device 200 and the receiver device is blocked.

According to an embodiment of the present disclosure, the beamforming unit 214 may select a sub-optimal beam to re-perform the beamforming process. According to an embodiment of the present disclosure, the beamforming unit 214 may re-perform the beamforming process by selecting a sub-optimal beam having the highest priority level from one or more sub-optimal beams. Here, in the case where the electronic device 200 acquires beamforming information from the server, the beamforming information may include priority levels corresponding to one or more sub-optimal beams; whereas in the case that the electronic device 200 does not acquire beamforming information from the server, the storage unit 213 may simultaneously store the priority levels of the one or more sub-optimal beams when storing the optimal beam and the one or more sub-optimal beams.

According to an embodiment of the present disclosure, the processing unit 210 may inform Rx of the information about the sub-optimal beam selected by Tx when transmitting a beam change request to Rx via the communication unit 220, so as to enable Rx to select the sub-optimal beam corresponding thereto.

According to an embodiment of the present disclosure, the processing circuit 210 is further configured to perform the following operations: when the electronic device 200 and the receiver device perform data transmission via the sub-optimal beam, if the channel quality suddenly drops, for example, if difference between the channel quality parameters per unit time is greater than a certain threshold, a sub-optimal beam with lower priority than the current suboptimal beam is selected to re-perform the beamforming process; causing the communication unit 220 to transmit a beam change request to the receiver device to request the receiver device to select a sub-optimal beam with a lower priority than the current sub-optimal beam to re-perform the beamforming process; and performing data transmission with the receiver device according to the result of the re-performed beamforming process.

According to an embodiment of the present disclosure, when the direct path between the electronic device 200 and the receiver device is blocked, the sub-optimal beam with the highest priority level may be selected. When communication needs are still not met in the case that the sub-optimal beam with the highest priority level is selected, a sub-optimal beam with a lower level can be selected, and so on. In this way, since the electronic device 200 stores the optimal beam and one or more sub-optimal beams in the beam training process, the beamforming information transmitted by the server also includes the optimal beam and one or more sub-optimal beams, so that when the direct path between the electronic device 200 and the receiver device is blocked, the sub-optimal beam can be selected to perform data transmission, and the communication quality can be effectively improved.

According to an embodiment of the present disclosure, the processing circuit 210 is further configured to perform the following operations: determining that a direct path between the electronic device 200 and the receiver device is restored; selecting an optimal beam to re-perform the beamforming process; causing the communication unit 220 to transmit a beam change request to the receiver device to request the receiver device to select an optimal beam to re-perform the beamforming process; and performing data transmission with the receiver device according to the result of the re-performed beamforming process.

Figure 12:
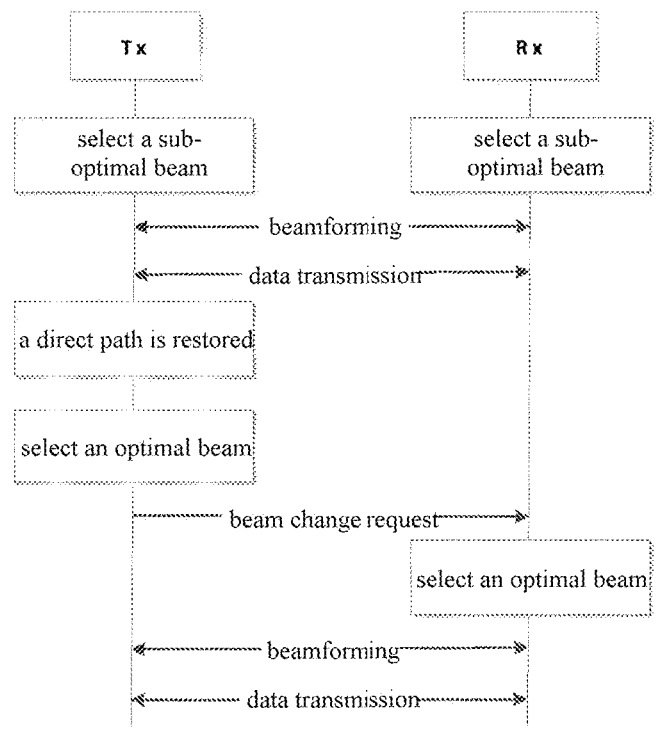
FIG. 12 is a diagram of signaling flow that a transmitter device reselects a beam when it finds that the direct path is restored according to an embodiment of the present disclosure.

FIG. 12 is a diagram of signaling flow for reselecting a beam in the case that a transmitter device finds that a direct path is restored according to an embodiment of the present disclosure.

As shown in FIG. 12, in the process of performing data transmission between the Tx and Rx via the sub-optimal beam, if Tx finds that the direct path is restored, then the optimal beam is selected and a beam change request is transmitted to Rx. Next, Rx selects the optimal beam. Next, Tx and Rx re-perform beamforming via the optimal beam and perform data transmission.

According to an embodiment of the present disclosure, the electronic device 200 (e.g., a determination unit, not shown) may determine that a direct path between the electronic device 200 and the receiver device is restored. For example, when the channel quality between the electronic device 200 and the receiver device is restored, for example, the channel quality is greater than a certain threshold, then the electronic device 200 determines that a direct path between the electronic device 200 and the receiver device is restored.

According to an embodiment of the present disclosure, regardless of which sub-optimal beam is used to perform the data transmission process between Tx and Rx, as long as the direct path is restored, the optimal beam is directly selected to re-perform beamforming and perform data transmission. In this way, the optimal beam can be used to perform data transmission, so as to enable the communication quality to be the best.

Data Transmission Unit 21

As mentioned in the foregoing, in the beam training process, only the training sequence may be transmitted, or the training sequence may be transmitted along with the data. Therefore, in the case where only the training sequence is transmitted in the beam training process, the data transmission unit 215 can directly perform data transmission with the receiver device, and in the case where the training sequence is transmitted along with the data in the beam training process, the data transmission unit 215 can perform the part of data transmission that is not completed during the data training process with the receiver device.

The structure and the embodiment of the transmitter device for D2D communication are described above with reference to FIGS. 2-12, and the structure and the embodiment of the receiver device for D2D communication will be described below with reference to FIGS. 13-16.

Figure 13:
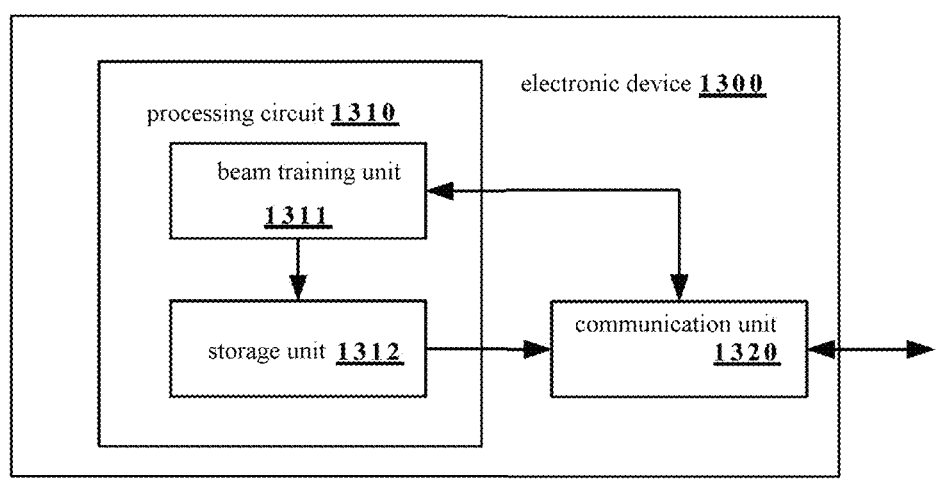
FIG. 13 is a block diagram of a structure of a receiver electronic device according to an embodiment of the present disclosure.

FIG. 13 is a block diagram of a structure of a receiver electronic device according to an embodiment of the present disclosure. The transmitter electronic device 1300 shown in FIG. 13 may be any one of the D2D receiver devices Rx1, Rx2 or Rx3 shown in FIG. 1.

As shown in FIG. 13, the electronic device 1300 may include a processing circuit 1310. It should be noted that the electronic device 1300 may include one processing circuit 1310 or a plurality of processing circuits 1310. In addition, the electronic device 1300 may further include a communication unit 1320 or the like as a transceiver.

Further, the processing circuit 1310 may include various discrete functional units to perform various different functions and/or operations. It should be noted that these functional units may be physical entities or logical entities, and differently named units may be implemented by the same physical entity.

For example, as shown in FIG. 13, the processing circuit 1310 may include a beam training unit 1311 and a storage unit 1312.

In the electronic device 1300 shown in FIG. 13, the beam training unit 1311 performs a beam training process between the electronic device 1300 and the transmitter device corresponding to the electronic device 1300 which is triggered by the transmitter device.

According to an embodiment of the present disclosure, the transmitter device requests beamforming information from a server in the wireless communication system based on the position information of the electronic device 1300 and the transmitter device, and when the transmitter device does not acquire the beamforming information from the server, the beam training process is triggered.

Here, the transmitter device corresponding to the electronic device 1300 is a transmitter device that is in the same D2D link as the electronic device 1300. For example, in the example shown in FIG. 1, Tx1 is a transmitter device corresponding to Rx1, Tx2 is a transmitter device corresponding to Rx2, and Tx3 is a transmitter device corresponding to Rx3. Further, the server may be a server whose service range includes the electronic device 1300 and the transmitter device corresponding to the electronic device 1300.

According to an embodiment of the present disclosure, the transmitter device corresponding to the electronic device 1300 may be the electronic device 200 described in the present disclosure.

According to an embodiment of the present disclosure, the beam training process may employ any beam training process known in the art, which is not limited in the present disclosure. Further, after the beam training process ends, the beam training unit 1311 can store the result of the beam training process in the storage unit 1312.

According to an embodiment of the present disclosure, the storage unit 1312 may store the result of the beam training process, and may cause the communication unit 1320 to report the result of the beam training process to the server after the beam training process ends.

The electronic device 1300 according to the present disclosure performs the beam training process only when the transmitter device does not acquire the beamforming information to thereby trigger the beam training process, and may report the result of the beam training to the server. In this way, the beam training process is not performed before all data transmission, which greatly simplifies the algorithm, and meanwhile, after beam training, the beam with the best transmission performance can be obtained, thereby obtaining higher transmission performance.

Referring back to FIG. 3, the electronic device 1300 according to the present disclosure may be the receiver device Rx shown in FIG. 3, and Tx is a transmitter device corresponding thereto. As shown in FIG. 3, Rx can simultaneously transmit its own position information when transmitting information indicating that the connection is agreed to Tx, so that Tx can know the position information of Rx. According to the embodiment of the present disclosure, Rx can obtain its own position information by any method known in the art, which is not limited in the present disclosure. Next, Tx requests beamforming information from the server based on the position information of Tx and Rx. Next, Tx determines that the requested beamforming information has not been obtained from the server, thereby triggering the beam training process with Rx. Next, Rx performs a beam training process with Tx. When the beam training process ends, Rx reports the result of the beam training to the server.

Beam Training Unit 1311

According to an embodiment of the present disclosure, when performing a beam training process, the beam training unit 1311 is further configured to perform the following operations: causing the communication unit 1320 to receive a training sequence transmitted from the transmitter device; storing a beam obtained from the training and causing the communication unit 1320 to transmit a training sequence to the transmitter device using the stored beam after the training sequence transmitted from the transmitter device is received each time; and causing the communication unit 1320 to receive the training sequence transmitted by the transmitter device after the training sequence is transmitted to the transmitter device each time.

According to an embodiment of the present disclosure, when performing a beam training process, the electronic device 1300 and the transmitter device corresponding to the electronic device 1300 sequentially transmit a training sequence. A training sequence is transmitted using the latest stored beam each time. After the training sequence is transmitted each time, it waits for the training sequence transmitted by the other party. After the training sequence transmitted by the other party is received each time, the beam obtained from training is stored.

Referring back to FIG. 4, the electronic device 1300 according to the present disclosure may be the receiver device Rx shown in FIG. 4, and Tx may be a transmitter device corresponding to the electronic device 1300. As shown in FIG. 4, the transmitter device Tx transmits a training sequence to the receiver device Rx. Here, since it is the first transmission after the beam training starts, Tx can transmit the training sequence to Rx using an omnidirectional antenna. In the present disclosure, the training sequence can be designed using any algorithm known in the art, which is not limited in this disclosure. Next, after Rx receives the training sequence transmitted by Tx, the training sequence is used to train the beam, thereby acquiring the trained beam R1, and storing the beam R1. Next, Rx transmits the training sequence to Tx using the stored beam R1. Next, after Tx receives the training sequence transmitted by Rx, the training sequence is used to train the beam, thereby acquiring the trained beam T1, and storing the beam T1. The whole beam training process is performed in a similar process. Tx uses the stored beam T1 to transmit a training sequence to Rx, Rx uses the stored beam R2 to transmit a training sequence to Tx, . . . , Rx uses the stored beam Rn to transmit a training sequence to Tx, and Tx uses the training sequence to train the beam, thereby acquiring the trained beam Tm and storing the beam Tm. Then the beam training process ends. In this beam training process, the transmitter device Tx stores m beams T1-Tm, and the receiver device Rx stores n beams R1-Rn. Here, both m and n are positive integers, and the relationship between m and n depends on the number of times a training sequence is transmitted. When the total number that Tx and Rx transmit training sequences is an even number, m=n; when the total number that Tx and Rx transmit training sequences is an odd number, m=n−1.

According to an embodiment of the present disclosure, when performing a beam training process, the beam training unit 1311 is further configured to perform the following operations: setting a predetermined threshold with respect to the number of times, when the total number that the electronic device 1300 and the transmitter device corresponding to the electronic device 1300 transmit training sequences reaches this predetermined threshold, the beam training process ends.

According to an embodiment of the present disclosure, this predetermined threshold with respect to the number of times may be set according to actual experience, thereby setting an end condition of the beam training process. Preferably, the predetermined threshold with respect to the number of times is 4 or 5.

According to an embodiment of the present disclosure, when performing a beam training process, the beam training unit 1311 is further configured to perform the following operation: ending the beam training process when the beam obtained by the last training meets a predetermined requirement. Specifically, when both the phase and the energy amplitude of the beam obtained by the last training meet the predetermined requirement, it is determined that the beam training process ends.

The two conditions at which the beam training process ends are given above, however, the present disclosure is not limited thereto, and other similar methods may be employed to define the conditions at which the beam training process ends. Further, it is possible to determine whether or not to end the beam training by the electronic device 200 as a transmitter device, or to determine whether or not to end the beam training by the electronic device 1300 as a receiver device. The method by which the electronic device 200 and the electronic device 1300 determine whether to end beam training may be the same or different.

As described above, according to an embodiment of the present disclosure, Tx and Rx sequentially transmit a beam training sequence, and each time a training sequence is received, the beam can be trained once. This process is a gradual convergence process, so that the beam is gradually corrected. When the beam training ends, the beams of Tx and Rx are both corrected towards each other air subsequent beamforming and data transmission operations. At the same time, the beam training process with the receiver device is performed only when the beamforming information is not acquired, which greatly simplifies the algorithm. Further, the beam training process is also an adaptive adjustment process, so that the beam with the best transmission performance can be obtained, and higher transmission performance can be obtained. Therefore, the advantages of both beamforming technologies of an adaptive beamforming and a fixed codebook beam switching are combined, and higher transmission performance is achieved on the basis of a simple algorithm.

In the example shown in FIG. 4, an example in which only a training sequence is transmitted between Tx and Rx is shown. According to an embodiment of the present disclosure, when causing the communication unit 1320 to transmit the training sequence to the transmitter device using the stored beam, the beam training unit 1311 is further configured to perform the following operation: causing the communication unit 1320 to transmit a training sequence and data together to the transmitter device using the stored beam.

According to an embodiment of the present disclosure, each time Tx or Rx transmits a training sequence, data may be simultaneously transmitted, where the data may be part of data that Tx desires to transmit to Rx. Further, each time the training sequence and data are transmitted, they are transmitted using the newly stored beam. In this way, a portion of the data can be transmitted using the trained beam without waiting for the end of the beam training process. In this case, although the trained beam is not the beam with a best performance and a most accurate directionality, the waiting time tor data transmission can be greatly reduced. According to an embodiment of the present disclosure, after the beam training process ends, the electronic device 1300 may continue to transmit data that has not been transmitted during the beam training process to the transmitter device corresponding to the electronic device 1300.

According to an embodiment of the present disclosure, when causing the communication unit 1320 to transmit the training sequence and data together to the transmitter device, the beam training unit 1311 is further configured to perform the following operation: making the training sequence follow the data to transmit together or making the data follow the training sequence to transmit together.

Referring back to FIG. 5 and FIG. 6, as shown in FIG. 5, the electronic device 1300 make the data follow the training sequence to transmit together. In the direction indicated by the arrow, the electronic device 1300 as a receiver device Rx first transmits a training sequence, and then transmits data, to the transmitter device Tx at each transmission. As shown in FIG. 6, the electronic device 1300 make the training sequence follow the data to transmit together. In the direction indicated by the arrow, the receiver device Rx first transmits data, and then transmits a training sequence, to the transmitter device Tx at each transmission. This process is similar to that of FIG. 5 and will not be described again here.

In the embodiments shown in FIGS. 5 and 6, although the beams T1-T(m−1) are still not the beam with a best performance and a most accurate directionality, Rx can still use them to transmit data to Tx, so that the beam training process can be performed simultaneously with the data transmission process, which can greatly reduce the waiting time for data transmission.

Storage Unit 1312

It is worth noting that in the existing beam training process, only the beam obtained from the last training is stored and this beam is used to perform beamforming and data transmission. In the embodiment of the present disclosure, the storage unit 1312 of the electronic device 1300 may store all the beams trained in the beam training process, including the beam obtained by the last training and the beams obtained by the intermediate process training. In other words, according to an embodiment of the present disclosure, the electronic device 1300 can store the "final value" and "intermediate value" of the beam training process.

According to an embodiment of the present disclosure, the storage unit 1312 is further configured to perform the following operation: taking the last stored beam as an optimal beam and taking other stored beams as sub-optimal beams. For example, in the example shown in FIGS. 4-6, the electronic device 1300 stores beam Rn as an optimal beam and other beams R1-R(n−1) as sub-optimal beams.

According to an embodiment of the present disclosure, the storage unit 1312 is further configured to perform the following operation: priority levels of the one or more sub-optimal beams may be simultaneously stored when the optimal beam and the one or more sub-optimal beams are stored. Specifically, the storage unit 1312 may perform the following operations to set the priority levels of sub-optimal beams, such that in the beam training process, the priority level of the beam obtained earlier is lower than the priority level of the beam obtained later. As shown in FIGS. 4-6, in the beam training process, the electronic device 1300 sequentially obtains beams R1, R2, . . . , R(n−1), Rn, where the beams R1, R2, . . . , R(n−1) belong to the sub-optimal beams, so the priority levels are: R1<R2< . . . <R (n−1). The storage unit 1312 also stores the priority levels of the beams R1, R2, . . . , R(n−1) while storing the beams.

According to an embodiment of the present disclosure, when causing the communication unit 1320 to report the result of the beam training process to the server, the storage unit 1312 is further configured to perform the following operation: causing the communication unit 1320 to report all the stored beams to the server. That is, the results of the beam training process include all of the beams stored by the electronic device 1300. For example, in the example shown in FIGS. 4-6, the electronic device 1300 reports the stored beam R1, beam R2, . . . , beam Rn to the server.

As mentioned in the foregoing, the electronic device 200 as a transmitter device can report the position information of the electronic device 200 and the receiver device corresponding to the electronic device 200 to the server. According to the embodiment of the present disclosure, the electronic device 200 can also only report its own position information, and the receiver device can report its own position information when reporting the result of the beam training. That is, according to an embodiment of the present disclosure, the processing circuit 1310 is further configured to report the position information of the electronic device 1300 to the server. In this way, the server can associate the position information of the electronic device 1300 and the position information of the electronic device 200 with the result of the beam training. When there is another transmitter that requests beamforming information from the server based on the same position information as the two position information, the server can return the result of this beam training.

As mentioned in the foregoing, the electronic device 200 as a transmitter device can report the channel quality condition between the electronic device 200 and the receiver device. According to an embodiment of the present disclosure, the electronic device 1300 as a receiver device can also report this information. That is, according to an embodiment of the present disclosure, the processing circuit 1310 is further configured to report the channel quality condition between the electronic device 1300 and the transmitter device corresponding to the electronic device 1300 to the server. That is, the result of the beam training process includes channel quality conditions between the electronic device 1300 and the transmitter device corresponding to the electronic device 1300. Channel quality conditions herein include, but are not limited to, signal to noise ratio, signal to interference ratio, and signal to interference and noise ratio.

According to an embodiment of the present disclosure, the processing circuit 1310 is further configured to report the time when each beam is stored to the server along with the beam. That is to say, the result of the beam training process also includes the time when a beam is stored.

In addition, the processing circuit 1310 may also report other types of information related to the electronic device 1300 and the transmitter device corresponding to the electronic device 1300 according to actual needs.

Figure 14:
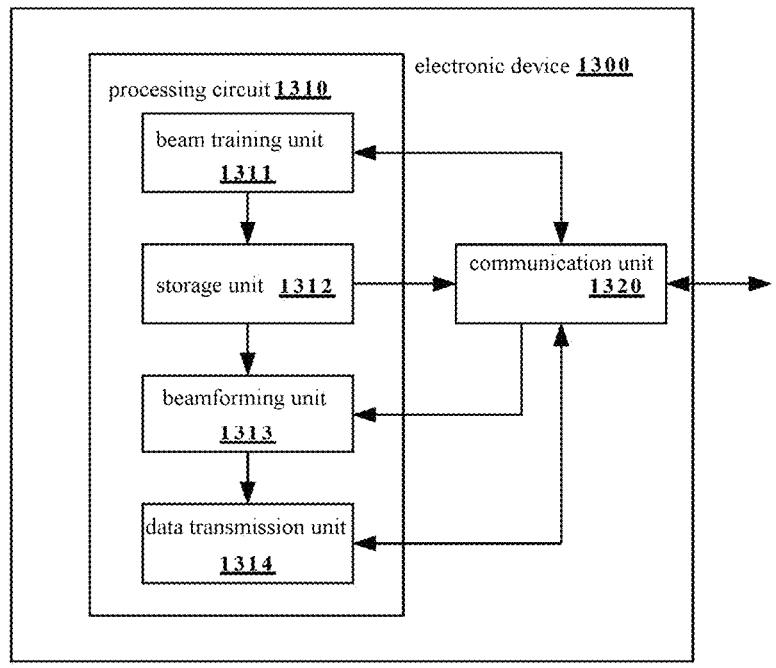
FIG. 14 is a block diagram of a structure of a receiver electronic device according to yet another embodiment of the present disclosure.

An electronic device 1300 according to yet another embodiment of the present disclosure will be described below with reference to FIG. 14. FIG. 14 is a block diagram of a structure of a receiver electronic device according to yet another embodiment of the present disclosure.

As shown in FIG. 14, the electronic device 1300 can include a processing circuit 1310. It should be noted that the electronic device 1300 may include one processing circuit 1310 or a plurality of processing circuits 1310. In addition, the electronic device 1300 may further include a communication unit 1320 or the like as a transceiver.

Further, the processing circuit 1310 may include various discrete functional units to perform various different functions and/or operations. It should be noted that these functional units may be physical entities or logical entities, and differently named units may be implemented by the same physical entity.

For example, as shown in FIG. 14, the processing circuit 1310 may include a beam training unit 1311, a storage unit 1312, a beamforming unit 1313, and a data transmission unit 1314. The beam training unit 1311 and the storage unit 1312 herein can employ the beam training unit 1311 and the storage unit 1312 shown in FIG. 13, and the functions thereof can also be the same as the respective units shown in FIG. 13, and thus will not be described herein.

According to an embodiment of the present disclosure, the beamforming unit 1313 may perform a beamforming process according to a result of a beam training process. That is, when the transmitter device corresponding to the electronic device 1300 does not acquire the requested beamforming information from the server, the beam training process may be triggered, thereby enabling the beamforming unit 1313 to perform the beamforming process according to the result of the beam training process.

According to an embodiment of the present disclosure, the data transmission unit 1314 may perform data transmission with the transmitter device according to the result of the beamforming process.

Referring back to FIG. 8, after Rx reports the result of beam training to the server, both Tx and Rx perform a beamforming process. Next, after the beamforming ends, Tx and Rx perform data transmission.

According to an embodiment of the present disclosure, when the transmitter deuce corresponding to the electronic device 1300 acquires beamforming information from the server, the electronic device 1300 may also acquire beamforming information from the server, so that the beamforming unit 1313 can also perform a beamforming process based on the acquired beamforming information. The data transmission unit 1314 can also perform data transmission with the transmitter device according to the result of the beamforming process.

Referring back to FIG. 9, Tx requests beamforming information from the server based on the position information of Tx and Rx. Next, the server returns beamforming information to Tx and Rx, respectively. Next, Rx performs a beamforming process based on the beamforming information received from the server. Next, after the beamforming ends, Tx and Rx perform data transmission.

According to an embodiment of the present disclosure, the beamforming information acquired by the electronic device 1300 from the server includes beam information required for the electronic device 1300 and the transmitter device corresponding to the electronic device 1300 to perform data transmission. Further, the beamforming information may further include an optimal beam and one or more sub-optimal beams required for the electronic device 1300 and the transmitter device corresponding to the electronic device 1300 to perform data transmission.

According to an embodiment of the present disclosure, after the electronic device 1300 reports the result of the beam training process to the server, the server may store the result of this beam training as the beamforming information corresponding to the position information of the electronic device 1300 and the position information of the transmitter device corresponding to the electronic device 1300.

As mentioned in the foregoing, the beamforming information requested by the electronic device 1300 from the server is the beamforming information corresponding to both the position information of the electronic device 1300 and the position information of the transmitter device corresponding to the electronic device 1300. That is, if the electronic device 1300 can acquire the requested beamforming information from the server, it indicates that before the transmitter device that corresponds to the electronic device 1300 desires to perform data transmission with the electronic device 1300, there is a transmitter device at the position of the transmitter device corresponding to the electronic device 1300, and there is a receiver device at the position of the electronic device 1300, and the transmitter device existing before this transmission performed a beam training process with the receiver device existing before this transmission, thereby reporting the result of the beam training process to the server. Therefore, when the electronic device 1300 performs data transmission this time, the result of the beam training process previously performed at the same position can be directly utilized, thereby eliminating the current beam training process.

According to an embodiment of the present disclosure, when the electronic device 1300 acquires beamforming information from a server, this beamforming information is directly used to perform a beamforming process, thereby eliminating the beam training process and reducing the number of beam trainings and increasing the efficiency of communication.

Beamforming Unit 1313

According to an embodiment of the present disclosure, the beamforming process performed by the beamforming unit 1313 includes a beam selecting process. In the case where the transmitter device corresponding to the electronic device 1300 does not acquire beamforming information from the server, a beam training may be triggered, and the electronic device 1300 performs a beamforming process according to the result of the beam training process, and the beam training process may generate an optimal beam and one or more sub-optimal beams; and in the case that the electronic device 1300 acquires beamforming information from the server, the beamforming process is performed according to the beamforming information, and the acquired beamforming information may also include an optimal beam and one or more sub-optimal beams. Therefore, the beam selecting process includes: selecting one beam from the optimal beam and one or more sub-optimal beams.

According to an embodiment of the present disclosure, when performing a beamforming process, the beamforming unit 1313 is further configured to select an optimal beam to perform a beamforming process. According to an embodiment of the present disclosure, by default, the beamforming unit 1313 may always select an optimal beam to perform the beamforming process. Of course, the beam selecting rule can also be set according to actual needs, so that the beam for beamforming is selected according to the beam selecting rule.

Referring back to FIG. 10, after the beamforming process starts, Rx selects the optimal beam from the optimal beam and one or more sub-optimal beams of Rx. Next, both Tx and Rx perform beamforming using their respective optimal beams. Here, the process of performing beamforming using a known beam is common knowledge in the art, which is not limited in the present disclosure.

The default case of selecting the optimal beam to perform the beamforming process is described above. However, it may occur in the actual scenario that the direct path between the transmitter device and the receiver device is blocked, while the optimal beam is precisely the beam of the transmitter device and the receiver device relative to each other, and the energy is relatively concentrated, so that the data between the transmitter device and the receiver device will be seriously lost in the case where the direct path is blocked. At this time, since the sub-optimal beam is more divergent with respect to the optimal beam, if the sub-optimal beam can be switched to an optimal beam, the data loss situation will be improved.

According to an embodiment of the present disclosure, the processing circuit 1310 is further configured to perform the following operations: determining that a direct path between the electronic device 1300 and the transmitter device is blocked; selecting a sub-optimal beam to re-perform the beamforming process; causing the communication unit 1320 to transmit a beam change request to the transmitter device to request the transmitter device to select the suboptimal beam to re-perform the beamforming process; and performing data transmission with the transmitter device according to the result of the re-performed beamforming process.

Figure 15:
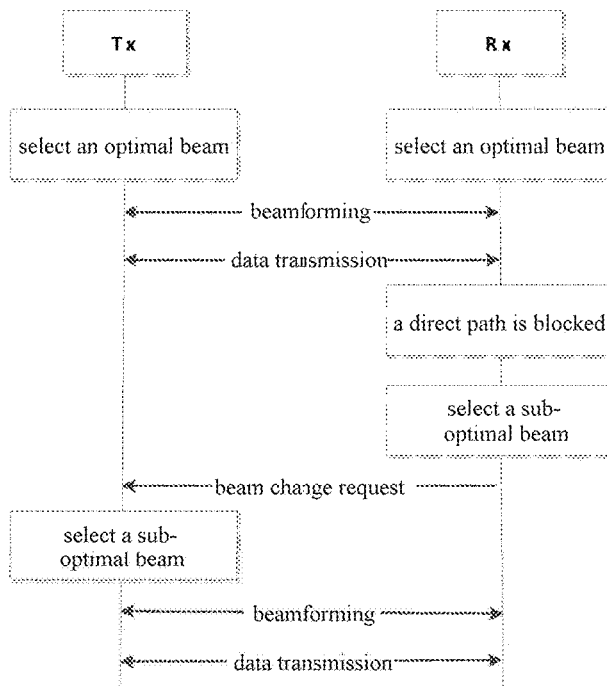
FIG. 15 is a diagram of signaling flow that a receiver device reselects a beam when it finds that a direct path is blocked according to an embodiment of the present disclosure.

FIG. 15 is a diagram of signaling flow for reselecting a beam in the case that the receiver device finds that the direct path is blocked according to an embodiment of the present disclosure. As shown in FIG. 15, in the process of performing data transmission via the optimal beam between Tx and Rx, if Rx finds that the direct path is blocked, then the sub-optimal beam is selected and a beam change request is transmitted to Tx. Next, Tx selects the sub-optimal beam. Next, Tx and Rx re-perform beamforming via the sub-optimal beam and perform data transmission. That is to say, both Rx and Tx can find that the direct path is blocked.

According to an embodiment of the present disclosure, the electronic device 1300 (e.g., a determination unit, not shown) may determine that a direct path between the electronic device 1300 and the transmitter device is blocked. For example, when the channel quality between the electronic device 1300 and the transmitter device suddenly drops, for example, the difference between the channel quality parameters per unit time is greater than a certain threshold, the electronic device 1300 determines the direct path between the electronic device 1300 and the transmitter device is blocked.

According to an embodiment of the present disclosure, the beamforming unit 1313 may select a suboptimal beam to re-perform the beamforming process. According to an embodiment of the present disclosure, the beamforming unit 1313 may re-perform the beamforming process by selecting a sub-optimal beam having the highest priority level from one or more sub-optimal beams. Here, in the case where the electronic device 1300 acquires beamforming information from the server, the beamforming information may include priority levels corresponding to one or more sub-optimal beams; whereas in the case that the electronic device 1300 does not acquire the beamforming information from the server, the storage unit 1312 may simultaneously store the priority levels of the one or more sub-optimal beams when storing the optimal beam and the one or more sub-optimal beams.

According to an embodiment of the present disclosure, the processing unit 1310 may inform Tx of the information about the sub-optimal beam selected by Rx when transmitting a beam change request to Tx via the communication unit 220, so as to enable Tx to select the sub-optimal beam corresponding thereto.

According to an embodiment of the present disclosure, the processing circuit 1310 is further configured to perform the following operations: when the electronic device 1300 and the transmitter device perform data transmission via the sub-optimal beam, if the channel quality suddenly drops, for example, if difference between the channel quality parameters per unit time is greater than a certain threshold, a sub-optimal beam with lower priority than the current sub-optimal beam is selected to re-perform the beamforming process; causing the communication unit 1320 to transmit a beam change request to the transmitter device to request the transmitter device to select a sub-optimal beam with a lower priority than the current sub-optimal beam to re-perform the beamforming process; and performing data transmission with the transmitter device according to the result of the re-performed beamforming process.

According to an embodiment of the present disclosure, when the direct path between the electronic device 1300 and the transmitter device is blocked, the sub-optimal beam with the highest priority level may be selected. When the communication needs are still not met in the case that the sub-optimal beam with the highest priority level is selected, a sub-optimal beam with a lower level can be selected, and so on. In this way, since the electronic device 1300 stores the optimal beam and one or more sub-optimal beams in the beam training process, the beamforming information transmitted by the server also includes the optimal beam and one or more sub-optimal beams, so that when the direct path between the electronic device 1300 and the transmitter device is blocked, the sub-optimal beam can be selected to perform data transmission, and the communication quality can be effectively improved.

According to an embodiment of the present disclosure, the processing circuit 1310 is further configured to perform the following operations: determining that a direct path between the electronic device 1300 and the transmitter device is restored; selecting an optimal beam to re-perform the beamforming process; causing the communication unit 1320 to transmit a beam change request to the transmitter device to request the transmitter device to select an optimal beam to re-perform the beamforming process; and performing data transmission with the transmitter device according to the result of the re-performed beamforming process.

Figure 16:
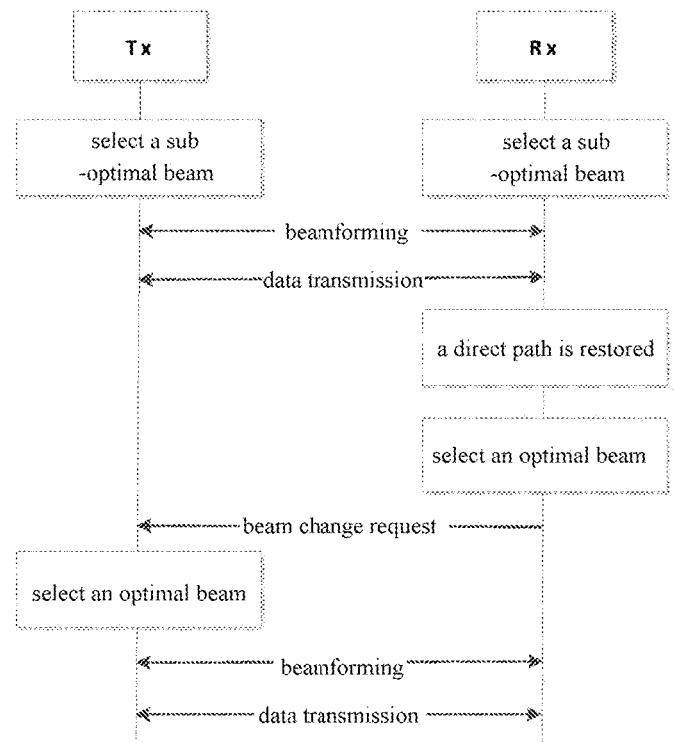
FIG. 16 is a diagram of signaling flow that a receiver device reselects a beam when it finds that the direct path is restored according to an embodiment of the present disclosure.

FIG. 16 is a diagram of signaling flow for reselecting a beam in the case that a receiver device finds that a direct path is restored according to an embodiment of the present disclosure.

As shown in FIG. 16, in the process of performing data transmission between the Tx and Rx via the sub-optimal beam, if the Rx finds that the direct path is restored, then the optimal beam is selected and a beam change request is transmitted to Tx. Next, Tx selects the optimal beam. Next, Tx and Rx re-perform beamforming via the optimal beam and perform data transmission. That is, both Tx and Rx can determine that direct path is restored.

According to an embodiment of the present disclosure, the electronic device 1300 (e.g., a determination unit, not shown) may determine that a direct path between the electronic device 1300 and the transmitter device is restored. For example, when the channel quality between the electronic device 1300 and the transmitter device is restored, for example, the channel quality is greater than a certain threshold, the electronic device 1300 determines that a direct path between the electronic device 1300 and the transmitter device is restored.

According to an embodiment of the present disclosure, regardless of which sub-optimal beam is being used to perform the data transmission process between Tx and Rx, as long as the direct path is restored, the optimal beam is directly selected to re-perform beamforming and perform data transmission. In this way, the optimal beam can be used to perform data transmission, so as to enable the communication quality to be the best.

Data Transmission Unit 1314

As mentioned in the foregoing, in the beam training process, only the training sequence may be transmitted, or the training sequence can be transmitted along with the data. Therefore, in the case where only the training sequence is transmitted in the beam training process, the data transmission unit 1314 can directly perform data transmission with the transmitter device, and in the case where the training sequence is transmitted along with the data in the beam training process, the data transmission unit 1314 can perform the part of data transmission that is not completed during the data training process with the transmitter device.

Figure 17:
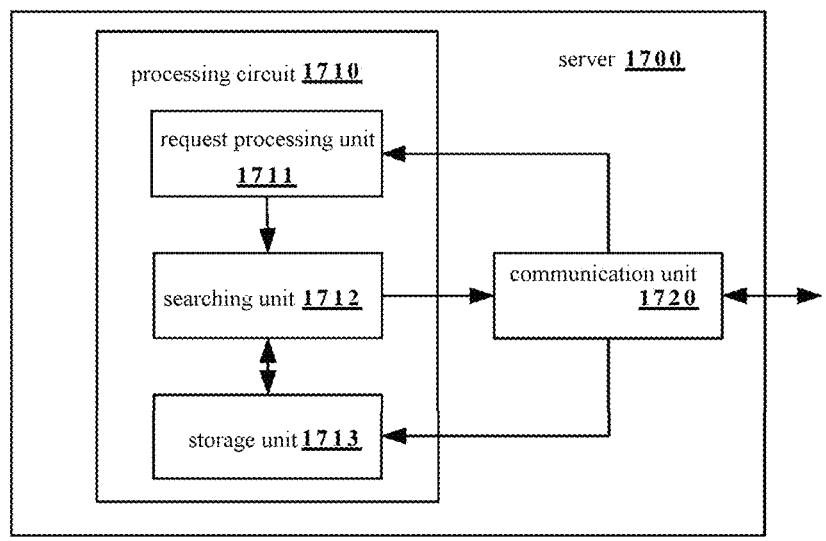
FIG. 17 is a block diagram of a structure of a server according to an embodiment of the present disclosure.

The electronic device 200 as a transmitter device and the electronic device 1300 as a receiver device in the wireless communication system have been described above, and the server 1700 in the wireless communication system will be described below with reference to FIGS. 17-20. FIG. 17 is a block diagram of a structure of a server according to an embodiment of the present disclosure.

The server 1700 shown in FIG. 17 may be the server shown in FIG. 1.

As shown in FIG. 17, the electronic device 1700 can include a processing circuit 1710. It should be noted that the electronic device 1700 may include one processing circuit 1710 or a plurality of processing circuits 1710. In addition, the electronic device 1700 may further include a communication unit 1720 or the like as a transceiver.

Further, the processing circuit 1710 may include various discrete functional units to perform various different functions and/or operations. It should be noted that these functional units may be physical entities or logical entities, and differently named units may be implemented by the same physical entity.

For example, as shown in FIG. 17, the processing circuit 1710 may include a request processing win 1711, a searching unit 1712, and a storage unit 1713.

According to an embodiment of the present disclosure, the request processing unit 1711 may cause the communication unit 1720 to receive a beamforming information request transmitted by the transmitter device that performs device-to-device D2D communication in the wireless communication system based on the position information of the transmitter device and the receiver device corresponding to the transmitter device.

Here, the transmitter device may be any one of the transmitter devices Tx1, Tx2 or Tx3 shown in FIG. 1, and the transmitter device may be the electronic device 200 described in the present disclosure, the structure and function thereof are described above. Further, the receiver device corresponding to the transmitter device may be Rx1, Rx2, or Rx3 shown in FIG. 1, and may be the electronic device 1300 described in the present disclosure, the structure and function thereof have also been described above.

According to an embodiment of the present disclosure, the searching unit 1712 may search a beamforming information table based on position information of the transmitter device and the receiver device.

According to an embodiment of the present disclosure, the beamforming information table may be stored in the storage unit 1713.

According to an embodiment of the present disclosure, when there is no beamforming information in the beamforming information table, the searching unit 1712 may cause the communication unit 1720 to notify the transmitter device to cause the transmitter device to trigger the beam training process between the transmitter device and the receiver device.

According to an embodiment of the present disclosure, the processing circuit 1710 may also cause the communication unit 1720 to receive the result of the beam training process from the transmitter device and store it in the beamforming information table.

According to an embodiment of the present disclosure, the beamforming information table is managed and maintained on the server side, and the beamforming information may be requested from the server when the transmitter device desires to perform data transmission with the receiver device, only if no corresponding beamforming information is found, the transmitter device may be informed to perform the beam training process, and the result of the beam training can be used to update the beamforming information table. In this way, the beam training process is not performed in all cases, which greatly simplifies the algorithm, and meanwhile, after beam training, the beam with the best transmission performance can be obtained, thereby obtaining higher transmission performance.

According to an embodiment of the present disclosure, the processing circuit 1710 is further configured to perform the following operation causing the communication unit 1720 to receive the result of the beam training process from the receiver device and storing it in the beamforming information table.

Figure 18:
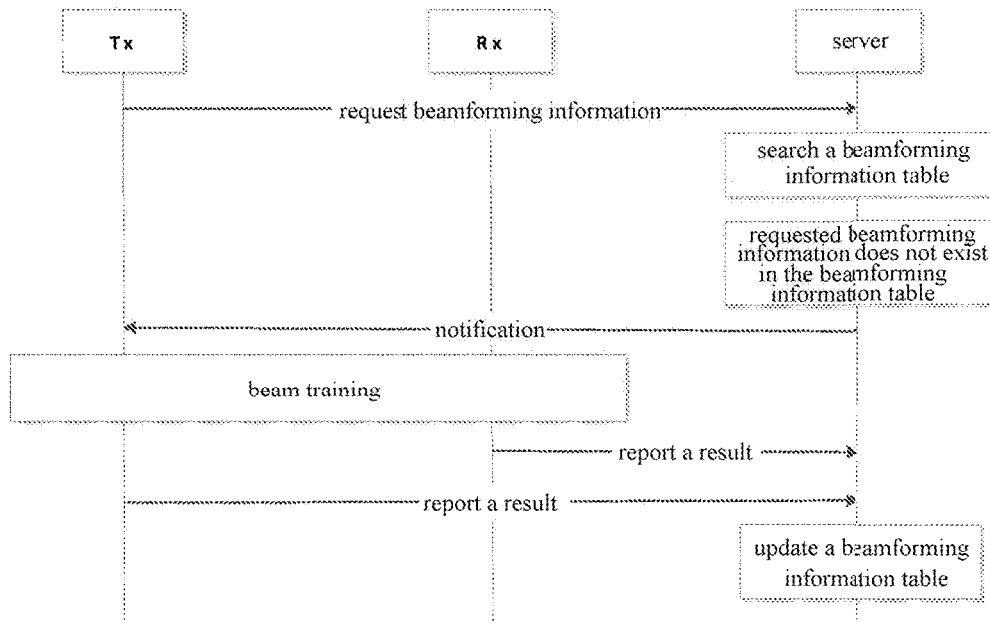
FIG. 18 is a diagram of signaling flow that a server does not find beamforming information according to an embodiment of the present disclosure.

FIG. 18 is a diagram of signaling flow that a server does not find beamforming information according an embodiment of the present disclosure. As shown in FIG. 1S, when the server receives the request beamforming information transmitted by Tx, the server searches the beamforming information table according to the position information of Tx and Rx, when there is no requested beamforming information in the beamforming information table, the server transmits a notification to Tx. Next, Tx triggers the beam training process with Rx based on the notification. When the beam training process ends, Tx and Rx report the results of the beam training to the server, respectively. Next, the server updates the beamforming information table based on the results reported by Rx and Tx.

According to an embodiment of the present disclosure, the searching unit 1712 is further configured to perform the following operation: causing the communication unit 1720 to transmit beamforming information to the transmitter device and the receiver device when the beamforming information exists in the team arming information table.

Figure 19:
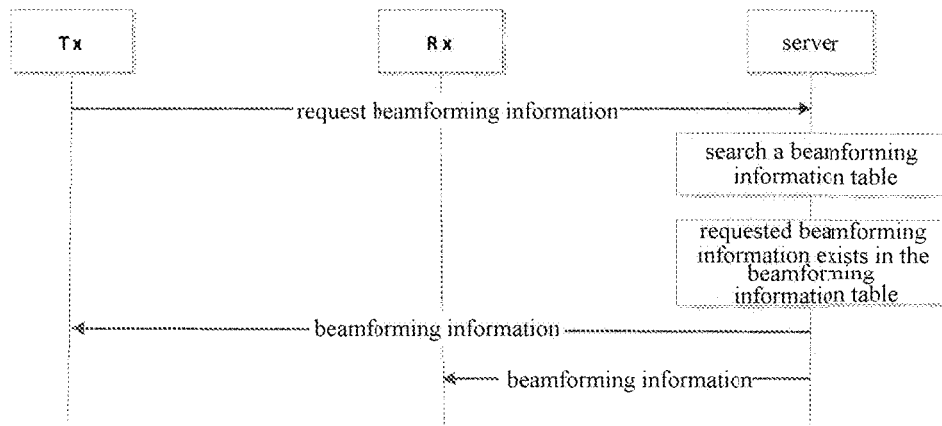
FIG. 19 is a diagram of signaling flow that a server finds beamforming information according to an embodiment of the present disclosure.

FIG. 19 is a diagram of signaling flow that a server finds beamforming information according to an embodiment of the present disclosure. As shown in FIG. 19, when the server receives the request beamforming information transmitted by Tx, the server searches the beamforming information table according to the position information of Tx and Rx, when the beamforming information requested by Tx exists in the beamforming information table, the beamforming information is transmitted to the transmitter device and the receiver device, respectively, to enable the transmitter device and the receiver device to perform beamforming process and data transmission process according to the beamforming information.

Request Processing Unit 1711

According to an embodiment of the present disclosure, the beamforming information request received from the transmitter device may include position information of the transmitter device and position information of the receiver device. Next, the request processing unit 1711 may transmit the position information of the transmitter device and the position information of the receiver device to the searching unit 1712.

Searching Unit 1712

According to an embodiment of the present disclosure, the searching unit 1712 searches a beamforming information table based on position information of the transmitter and position information of the receiver. That is to say, the beamforming information table is searched by using both the position information of the transmitter and the position information of the receiver as parameters. Here, the searching unit 1712 may acquire the position information of the transmitter and the position information of the receiver from the request processing unit 1711, and may search the beamforming information table stored in the storage unit 1713.

According to an embodiment of the present disclosure, when the beamforming information requested by the transmitter device exist in the beamforming information table, the searching unit 1712 may receive beamforming information from the storage unit 1713, such beamforming information may include beamforming information of the transmitter and beamforming information of the receiver. Next, the searching unit 1712 can transmit the beamforming information of the transmitter to the transmitter device via the communication unit 1720, and transmit the beamforming information of the receiver to the receiver device. When the beamforming information requested by the transmitter device does not exist in the beamforming information table, the searching unit 1712 may receive the null information from the storage unit 1713. Next, the searching unit 1712 may transmit a notification to the transmitter device via the communication unit 1720 to notify the transmitter device that the requested beamforming information does not exist in the beamforming information table.

Storage Unit 1713

According to an embodiment of the present disclosure, the storage unit 1713 may store the beamforming information table, and may return the information in the beamforming information table according to the request of the searching unit 1713. Further, the storage unit 1713 may update the beamforming information table according to the beam training result received from the receiver device and the transmitter device via the communication unit 1720, or may update the beamforming information table according to an instruction of the processing unit 1710 (for example, a maintenance unit, not shown).

FIG. 20 shows an example of a beamforming information table according to an embodiment of the present disclosure. As shown in FIG. 20, the first column indicates the position of the transmitter device Tx, the first row indicates the position of the receiver device Rx, and the middle of the table indicates the beamforming information corresponding to the beam from the position of a certain transmitter device to the position of a certain receiver device. It is to be noted that FIG. 20 only shows one example of a beamforming information table, and the beamforming information table may of course take other forms.

It is assumed that the position information of the transmitter indicates that the transmitter is at position 1, and the position information of the receiver indicates that the receiver is at position 2. When the searching unit 1712 searches a beamforming information table such as that shown in FIG. 20 based on the two position information, the beamforming information corresponding to a beam from position 1 to position 2 can be obtained, and the beamforming information is transmitted to the transmitter device and the receiver device, separately.

According to an embodiment of the present disclosure, the beamforming information in the beamforming information table includes beamforming information of the transmitter and beamforming information of the receiver. That is to say, after the searching unit obtains the beamforming information, the beamforming information of the transmitter may be transmitted to the transmitter device, and the beamforming information of the receiver may be transmitted to the receiver device.

According to an embodiment of the present disclosure, the beamforming information of the transmitter may include an optimal beam and one or more sub-optimal beams for the transmitter device, and the beamforming information of the receiver may also include an optimal beam and one or more sub-optimal beams tor the receiver device.

According to an embodiment of the present disclosure, the beamforming information of the transmitter may include an optimal beam and one or more sub-optimal beams and a priority level of each sub-optimal beam, and the beamforming information of the receiver may also include an optimal beam and one or more sub-optimal beams and a priority level of each sub-optimal beam.

In this way, when the requested beamforming information exists in the table, both the transmitter device and the receiver device can receive the optimal beam and one or more sub-optimal beams, and can also receive a priority level of each beam. The transmitter device and the receiver device can select the optimal beam by default for beamforming and data transmission, and when the direct path between the transmitter device and the receiver device is blocked, it is switched to a sub-optimal beam according to the priority level of the sub-optimal beam for beamforming and data transmission.

According to an embodiment of the present disclosure, when causing the communication unit 1720 to receive the result of the beam training process from the transmitter device and the receiver device and store it in the beamforming information table, the processing circuit 1710 is further configured to perform the following operations: causing the communication unit 1720 to receive the optimal beam and the sub-optimal beam from the transmitter device; causing the communication unit 1720 to receive the optimal beam and the sub-optimal beam from the receiver device; and storing the optimal beams and the sub-optimal beams received from the transmitter device and the receiver device as beamforming information corresponding to position information of the transmitter device and the receiver device.

According, to an embodiment of the present disclosure, the result of the beam training process received from the transmitter device may include the optimal beam and one or more sub-optimal beams obtained by the transmitter device in the beam training process, and the result of the beam training process received from the receiver device may include the optimal beam and one or more sub-optimal beams obtained by the receiver device in the beam training.

According to an embodiment of the present disclosure, when the server 1700 receives a beamforming information request from a transmitter device, the position information of the transmitter device and the position information of the receiver device have been obtained. Therefore, the processing circuit 1710 can store, according to the two position information, the optimal beam and one or more sub-optimal beams received from the transmitter device and the optimal beam and one or more sub-optimal beams received from the receiver device in the corresponding position in the beamforming information table.

According to an embodiment of the present disclosure, when causing the communication unit 1720 to receive the result of the beam training process from the transmitter device and the receiver device and store it in the beamforming information table, the processing circuit 1710 may also perform the following operations: causing the communication unit 1720 to receive the position information of the transmitter device and the position information of the receiver device from the transmitter device; or causing the communication unit 1720 to receive the position information of the transmitter device from the transmitter device, and receive the position information of the receiver device from the receiver device. According to an embodiment of the present disclosure, the server may receive the position information of the transmitter device and the receiver device while receiving the result of the beam training process, so that the acquired position information is more accurate.

According to an embodiment of the present disclosure, when causing the communication unit 1720 to receive the result of the beam training process from the transmitter device and the receiver device and store it in the beamforming information table, the processing circuit 1710 may also perform the following operations: causing the communication unit 1720 to receive the optimal beam and the sub-optimal beam and the priority level of each sub-optimal beam from the transmitter device; and causing the communication unit 1720 to receive the optimal beam and the sub-optimal beam and the priority level of each sub-optimal beam from the receiver device. In this way when the server 1700 returns beamforming information to other transmitter devices and receiver devices, the priority level of the sub-optimal beam can be returned.

According to an embodiment of the present disclosure, when causing the communication unit 1720 to receive the result of the beam training process from the transmitter device and the receiver device and store it in the beamforming information table, the processing circuit 1710 may also perform the following operations: causing the communication unit 1720 to receive the optimal beam and the sub-optimal beam and the storage time of each beam from the transmitter device; causing the communication unit 1720 to receive the optimal beam and the sub-optimal beam and the storage time of each beam from the receiver device.

According to an embodiment of the present disclosure, the server 1700 may establish and update a beamforming information table according to a result of a beam training process received from a transmitter device and a receiver device, such that when the beam training process has occurred at a certain transmitter position and a certain receiver position, the current transmitter device and receiver device can directly use the beamforming information in the beamforming information table without repeating the beam training process, thereby reducing the number of the beam training. Further, the transmitter device and the receiver device as the user equipment have the authority to establish and update the beamforming information table on the server side, so that the beamforming information table is more accurate.

According to an embodiment of the present disclosure, the processing circuit 1710 (e.g., a maintenance unit, not shown) is further configured to perform the following operations: setting a survival period for beamforming information in a beamforming information table; and deleting the beamforming information that exceeds the survival period.

As mentioned in the foregoing, the processing circuit 1710 can cause the communication unit 1720 to receive the optimal beam and the sub-optimal beam and the storage time of each beam from the transmitter device, and cause the communication unit 1720 to receive the optimal beam and the sub-optimal beam and the storage time of each beam from the receiver device. On this basis, the processing circuit 1710 may also set a survival period, and determine whether the beam exceeds the survival period according to the storage time and the survival period of the beam, thereby deleting the beamforming information that exceeds the survival period.

According to an embodiment of the present disclosure, the server 1700 may delete the beamforming information that the survival time is too long, so as to prevent the storage space occupied by the beamforming information table from increasing, and meanwhile, the part of the beamforming information that the survival time is too long may no longer be accurate, and deleting this part of the beamforming information may also improve the accuracy of the beamforming information returned to the transmitter device and the receiver device.

Various specific embodiments of various processes performed by the server 1700 side according to an embodiment of the present disclosure have been described in detail above when the electronic device 200 and the electronic device 1300 are described, and thus all of the embodiments of the electronic device 200 and the electronic device 1300 are applied to this.

Next, a wireless communication method according to an embodiment of the present disclosure will be described with reference to FIG. 21. FIG. 21 is a flowchart illustrating a wireless communication method according to an embodiment of the present disclosure. The method shown in FIG. 21 is executed by the transmitter device for D2D communication.

As shown in FIG. 21, first, in step S2110, requesting beamforming information from a server in the wireless communication system based on position information of the transmitter device and the receiver device corresponding to the transmitter device.

Next, in step S2120, triggering the beam training process between the transmitter device and the receiver device when the beamforming information is not acquired from the server.

Next, in step S2130, reporting a result of the beam training process to the server after the beam training process ends.

Preferably, performing the beam training process includes: transmitting a training sequence to the receiver device; receiving a training sequence transmitted from the receiver device after transmitting the training sequence to the receiver device each time; and storing the beam obtained from training after receiving the training sequence transmitted by the receiver device, and transmitting the training sequence to the receiver device using the stored beam.

Preferably, performing the beam training process includes: taking the last stored beam as an optimal beam, and taking other stored beams as sub-optimal beams.

Preferably, transmitting the training sequence to the receiver device using the stored beam includes: transmitting the training sequence and data together to the receiver device using the stored beam.

Preferably, transmitting the training sequence and data together to the receiver device includes: making the training sequence follow the data to transmit together or making the data follow the training sequence to transmit together.

Preferably, reporting the result of the beam training process to the server includes: reporting all the stored beams to the server.

Preferably, the method further includes: performing a beamforming process according to a result of the beam training process; and performing data transmission with the receiver device according to a result of the beamforming process.

Preferably, the method further includes: performing beamforming process according to the acquired beamforming information when the beamforming information is acquired from the server; and performing data transmission with the receiver device according to a result of the beamforming process.

Preferably, performing the beamforming process includes: selecting an optimal beam to perform a beamforming process.

Preferably, the method further includes: determining that a direct path with the receiver device is blocked; selecting a sub-optimal beam to re-perform the beamforming process; and transmitting a beam change request to the receiver device to request the receiver device to select the sub-optimal beam to re-perform the beamforming process; and performing data transmission with the receiver device according to the result of the re-performed beamforming process.

Preferably, the method further includes: determining that a direct path with the receiver device is restored; selecting an optimal beam to re-perform the beamforming process; and transmitting a beam change request to the receiver device to request the receiver device to select the optimal beam to re-perform the beamforming process; and performing data transmission with the receiver device according to the result of the re-performed beamforming process.

Figure 22:
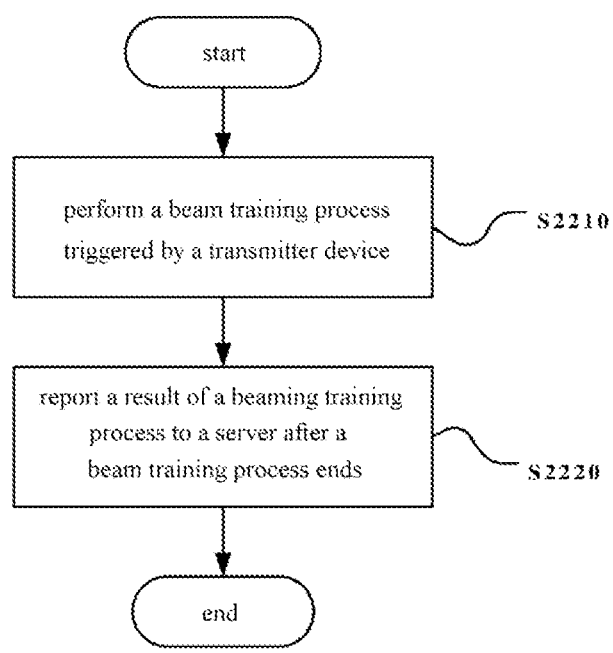
FIG. 22 is a flowchart illustrating a wireless communication method according to another embodiment of the present disclosure.

Next, a wireless communication method according to another embodiment of the present disclosure is described with reference to FIG. 22. FIG. 22 is a flowchart illustrating a wireless communication method according to another embodiment of the present disclosure. The method shown in FIG. 22 is performed by a receiver device for D2D communication.

As shown in FIG. 22, first, in step S2210, performing a beam training process between the receiver device and the transmitter device corresponding to the receiver device which is triggered by the transmitter device.

Next, in step S2220, after the beam training process ends, reporting the result of the beam training process to the server in the wireless communication system.

Wherein the transmitter device requests beamforming information from the server based on position information of the transmitter device and the receiver device, and triggers a beam training process when the transmitter device does not acquire the beamforming information from the server.

Preferably, performing the beam training process includes: receiving a training sequence transmitted from the transmitter device; storing the beam obtained from training after receiving the training sequence transmitted from the transmitter device each time, and transmitting the training sequence to the transmitter device using the stored beam; and receiving the training sequence transmitted from the transmitter device after transmitting the training sequence to the transmitter device each time.

Preferably, performing the beam training process includes: taking the last stored beam as an optimal beam, and taking other stored beams as sub-optimal beams.

Preferably, transmitting the training sequence to the transmitter device using the stored beam includes: transmitting the training sequence and data together to the transmitter device using the stored beam.

Preferably, transmitting the training sequence and data together to the transmitter device includes: making, the graining sequence follow the data to transmit together or making the data follow the training sequence to transmit together.

Preferably, reporting the result of the beam training process to the server includes: reporting all the stored beams to the server.

Preferably, the method further includes: performing a beamforming process according to a result of the beam training process; and performing data transmission with the transmitter device according to a result of the beamforming process.

Preferably, the method further includes: acquiring beamforming information from the server, performing beamforming process according to the acquired beamforming information; and performing data transmission with the transmitter device according to a result of the beamforming process.

Preferably, performing the beamforming process includes: selecting an optimal beam to perform a beamforming process.

Preferably, the method further includes: determining that a direct path with the transmitter device is blocked; selecting a sub-optimal beam to re-perform the beamforming process; and transmitting a beam change request to the transmitter device to request the transmitter device to select the sub-optimal beam to re-perform the beamforming process; and performing data transmission with the transmitter device according to the result of the re-performed beamforming process.

Preferably, the method further includes: determining that a direct path with the transmitter device is restored; selecting an optimal beam to re-perform the beamforming process; and transmitting a beam change request to the transmitter device to request the transmitter device to select the optimal beam to re-perform the beamforming process; and performing data transmission with the transmitter device according to the result of the re-performed beamforming process.

Figure 23:
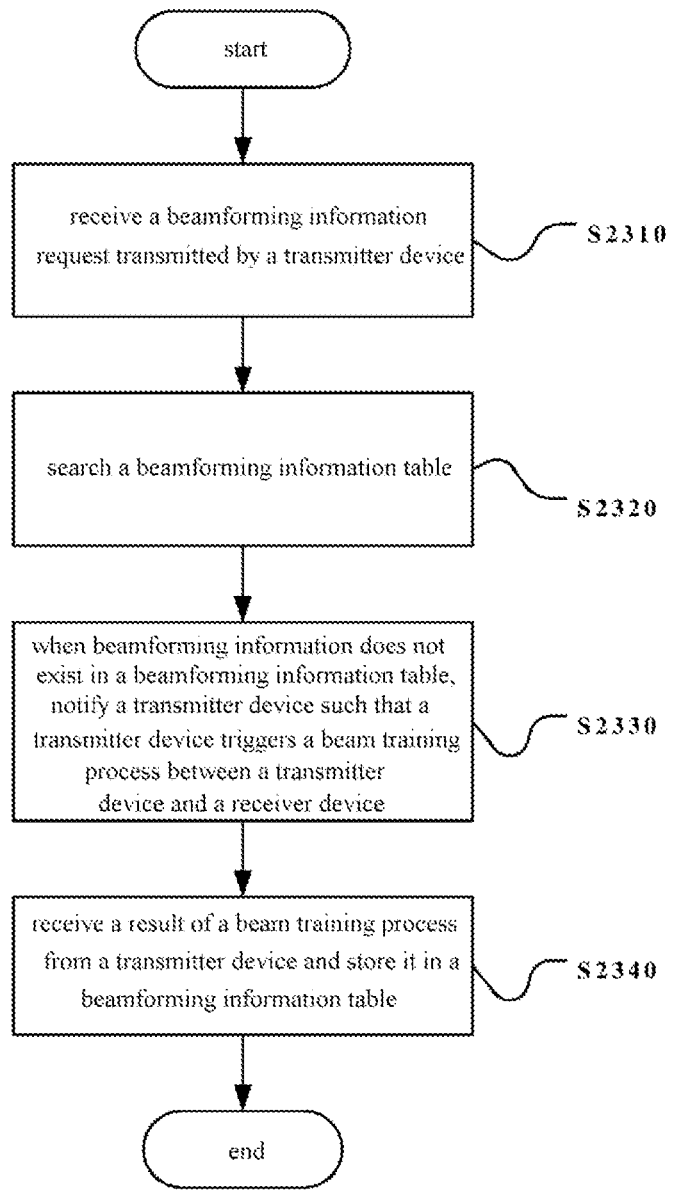
FIG. 23 is a flowchart illustrating a wireless communication method according to yet another embodiment of the present disclosure.

Next, a wireless communication method according to another embodiment of the present disclosure is described with reference to FIG. 23. FIG. 23 is a flowchart illustrating a wireless communication method according to another embodiment of the present disclosure. The method shown in FIG. 23 is performed by a server for D2D communication.

As shown in FIG. 23, first, in step S2310, receiving a beamforming information request transmitted by the transmitter device in the wireless communication system that performs device to device D2D communication based on the position information of the transmitter device and the receiver device corresponding to the transmitter device.

Next, in step S2320, searching a beamforming information table based on the position information of the transmitter device and the receiver device.

Next, in step S2330, when the beamforming information does not exist in the beamforming information table, notifying the transmitter device such that the transmitter device triggers a beam training process between the transmitter device and the receiver device.

Next, in step S2340, receiving a result of the beam training process from the transmitter device and storing it in the beamforming information table.

Preferably, the method also includes: receiving a result of the beam training process from the receiver device and storing it in the beamforming information table.

Preferably, receiving a result of the beam training process from the transmitter device and the receiver device and storing it in the beamforming information table includes: receiving the optimal beam and sub-optimal beam from the transmitter device, receiving the optimal beam and sub-optimal beam from the receiver device; and storing the optimal beams and the sub-optimal beams received from the transmitter device and the receiver device as beamforming information corresponding to position information of the transmitter device and the receiver device.

Preferably, the method also includes: when the beamforming information exists in the beamforming information table, transmitting the beamforming information to the transmitter device and the receiver device.

Preferably, the method also includes: setting a survival period for the beamforming information in the beamforming information table; and deleting beamforming information that exceeds the survival period.

Various specific embodiments of the above various steps of the method for wireless communication in a wireless communication system according to an embodiment of the present disclosure have been described in detail above when the electronic device 200, the electronic device 1300, and the server 1700 are described, and thus it will not be repeated here. Therefore, various embodiments describing the electronic device 200, the electronic device 1300, and the server 1700 are applied to this.

The technology of the present disclosure is applicable to various products. For example, a base station motioned in the present disclosure may be realized as any type of evolved Node B (eNB) such as a macro eNB and a small eNB. The small eNB may be an eNB such as a pico eND, a micro eND, and a home (femto) eND that covers a cell smaller than a macro cell. Instead, the base station may be realized as any other types of base stations such as a NodeB and a base transceiver station (BTS). The base station may include a main body (that is also referred to as a base station apparatus) configured to control radio communication, and one or more remote radio heads (RRH) disposed in a different place from the main body. In addition, various types of terminals, which will be described below, may each operate as the base station by temporarily or semi-persistently executing a base station function.

For example, a UE mentioned in the present disclosure may be realized as a mobile terminal (such as a smartphone, a tablet personal computer (PC), a notebook PC, a portable game terminal, a portable/dongle type mobile router, and a digital camera), or an in-vehicle terminal (such as a car navigation apparatus). The UE may also be realized as a terminal (that is also referred to as a machine type communication (MTC) terminal) that performs machine-to-machine (M2M) communication. Furthermore, the UE may be a radio communication module (such as an integrated circuit module including a single die) mourned on each of the terminals.

Figure 24:
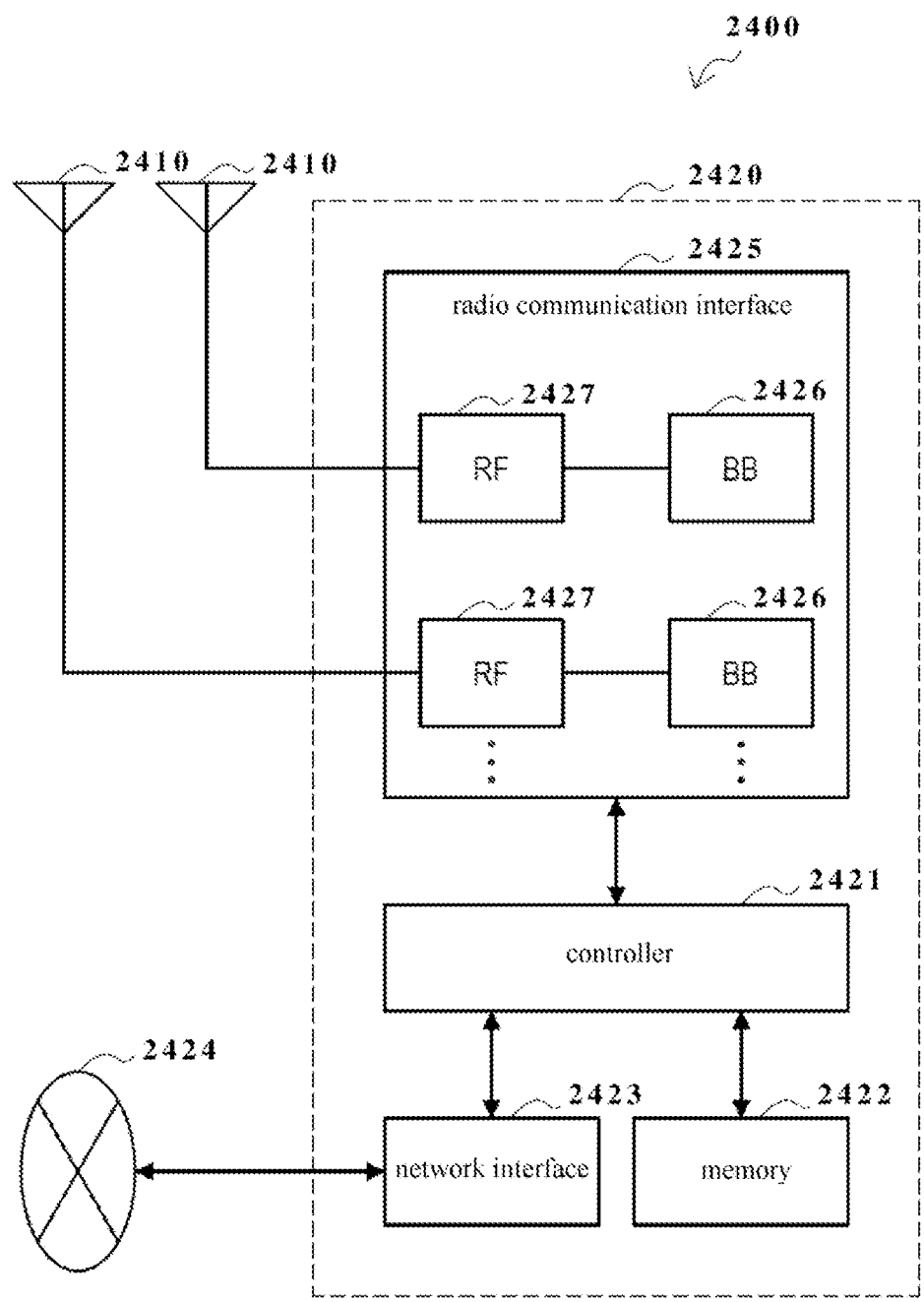
FIG. 24 is a block diagram illustrating a first example of a schematic configuration of an eNB (evolution Node Base Station) which is applied to the present disclosure.

FIG. 24 is a block diagram illustrating a first example of a schematic configuration of an eNB to which the technology of the present disclosure may be applied. An eNB 2400 includes one or more antennas 2410 and a base station apparatus 2420. Each antenna 2410 and the base station apparatus 2420 may be connected to each other via an RF cable.

Each of the antennas 2410 includes a single or multiple antenna elements (such as multiple antenna elements included in a multiple input multiple output (MIMO) antenna), and is used for the base station apparatus 2420 to transmit and receive radio signals. The eNB 2400 may include the multiple antennas 2410, as illustrated in FIG. 24. For example, the multiple antennas 2410 may be compatible with multiple frequency bands used by the eNB 2400. Although FIG. 24 illustrates the example in which the eNB 2400 includes the multiple antennas 2410, the eNB 2400 may also include a single antenna 2410.

The base station apparatus 2420 includes a controller 2421, a memory 2422, a network interface 2423, and a radio communication interface 2425.

The controller 2421 may be, for example, a CPU or a DSP, and operates various functions of a higher layer of the base station apparatus 2420. For example, the controller 2421 generates a data packet from data in signals processed by the radio communication interface 2425, and transfers the generated packet via the network interface 2423. The controller 2421 may bundle data from multiple base band processors to generate the bundled packet, and transfer the generated bundled packet. The controller 2421 may have logical functions of performing control such as radio resource control, radio bearer control, mobility management, admission control, and scheduling. The control may be performed in corporation with an eNB or a core network node in the vicinity. The memory 2422 includes RAM and ROM, and stores a program that is executed by the controller 2421, and various types of control data (such as a terminal list, transmission power data, and scheduling data).

The network interface 2423 is a communication interface for connecting the base station apparatus 2420 to a core network 2424. The controller 2421 may communicate with a core network node or another eNB via the network interface 2423. In that case, the eNB 2400, and the core network node or the other eNB may be connected to each other through a logical interface (such as an S1 interface and an X2 interface). The network interface 2423 may also be a wired communication interface or a radio communication interface for radio backhaul. If the network interface 2423 is a radio communication interface, the network interface 2423 may use a higher frequency band for radio communication than a frequency band used by the radio communication interface 2425.

The radio communication interface 2425 supports any cellular communication scheme (such as Long Term Evolution (LTE) and LTE-Advanced), and provides radio connection to a terminal positioned in a cell of the eNB 2400 via the antenna 2410. The radio communication interface 2425 may typically include, for example, a baseband (BB) processor 2426 and an RF circuit 2427. The BB processor 2426 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 2426 may have a part or all of the above-described logical functions instead of the controller 2421. The BB processor 2426 may be a memory that stores a communication control program, or a module that includes a processor and a related circuit configured to execute the program. Updating the program may allow the functions of the BB processor 2426 to be changed. The module may be a card or a blade that is inserted into a slot of the base station apparatus 2420. Alternatively, the module may also be a chip that is mounted on the card or the blade. Meanwhile, the RF circuit 2427 may include, for example, a mixer, a filter, and an amplifier, and transmits and receives radio signals via the antenna 2410.

The radio communication interface 2425 may include the multiple BB processors 2426, as illustrated in FIG. 24. For example, the multiple BB processors 2426 may be compatible with multiple frequency bands used by the eNB 2400. The radio communication interface 2425 may include the multiple RF circuits 2427, as illustrated in FIG. 24. For example, the multiple RF circuits 2427 may be compatible with multiple antenna elements. Although FIG. 24 illustrates the example in which the radio communication interface 2425 includes the multiple BB processors 2426 and the multiple RF circuits 2427, the radio communication interface 2425 may also include a single BB processor 2426 or a single RF circuit 2427.

Figure 25:
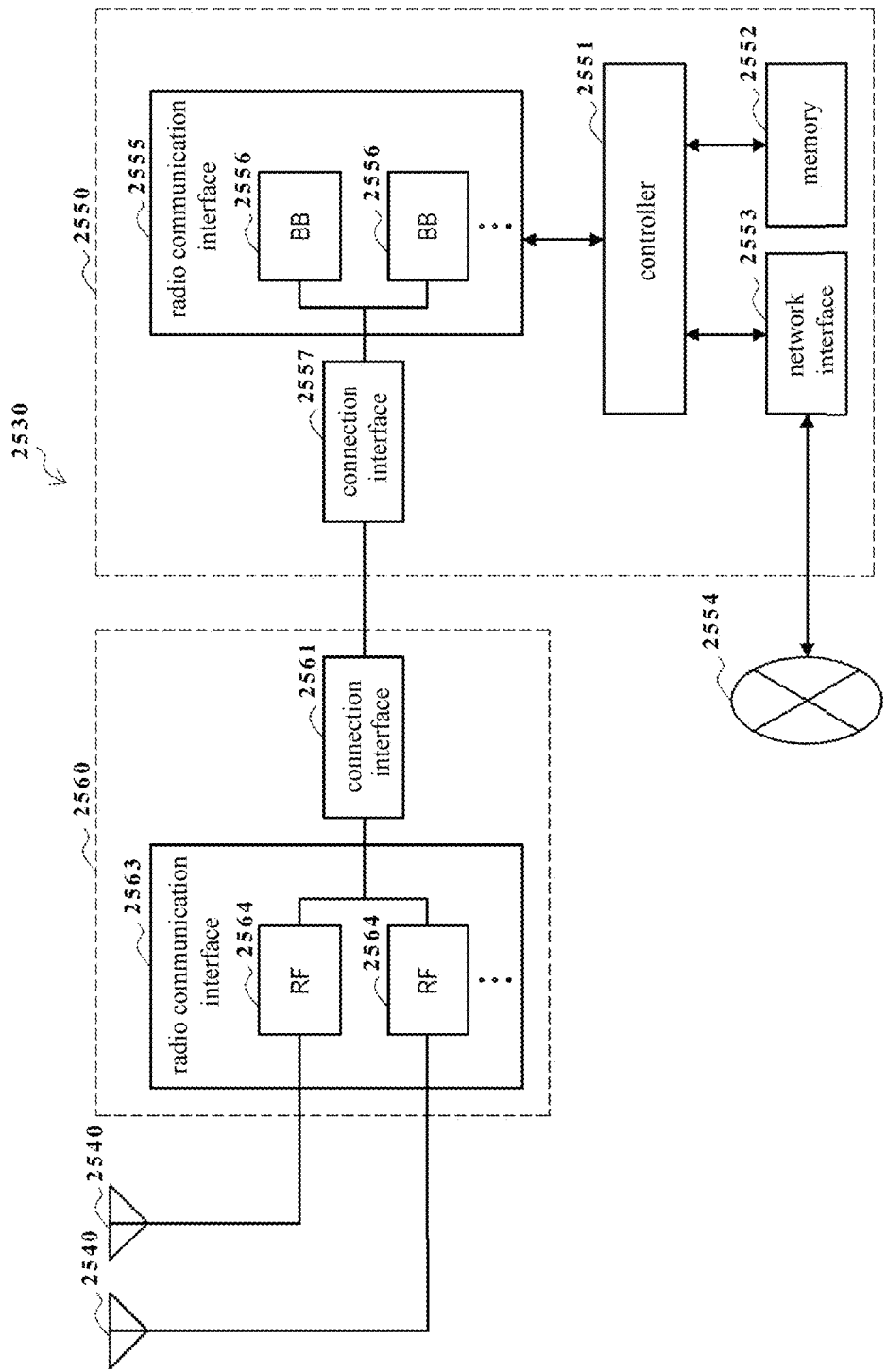
FIG. 25 is a block diagram illustrating a second example of a schematic configuration of an eNB which is applied to the present disclosure.

FIG. 25 is a block diagram illustrating a second example of a schematic configuration of an eNB to which the technology of the present disclosure may be applied. An eNB 2530 includes one or more antennas 2540, a base station apparatus 2550, and an RRH 2560. Each antenna 2540 and the RRH 2560 may be connected to each other via an RF cable. The base station apparatus 2550 and the RRH 2560 may be connected to each other via a high speed line such as an optical fiber cable.

Each of the antennas 2540 includes a single or multiple antenna elements (such as multiple antenna elements included in an MIMO antenna), and is used for the RRH 2560 to transmit and receive radio signals. The eNB 2530 may include the multiple antennas 2540, as illustrated in FIG. 25. For example, the multiple antennas 2540 may be compatible with multiple frequency bands used by the eNB 2530. Although FIG. 25 illustrates the example in which the eNB 2530 includes the multiple antennas 2540, the eNB 2530 may also include a single antenna 2540.

The base station apparatus 2550 includes a controller 2551, a memory 2552, a network interface 2553, a radio communication interface 2555, and a connection interface 2557. The controller 2551, the memory 2552, and the network interface 2553 are the same as the controller 2421, the memory 2422, and the network interface 2423 described with reference to FIG. 24.

The radio communication interface 2555 supports any cellular communication scheme (such as LTE and LTE-Advanced), and provides radio communication to a terminal positioned in a sector corresponding to the RRH 2560 via the RRH 2560 and the antenna 2540. The radio communication interface 2555 may typically include, for example, a BB processor 2556. The BB processor 2556 is the same as the BB processor 2426 described with reference to FIG. 24, except the BB processor 2556 is connected to the RF circuit 2564 of the RRH 2560 via the connection interface 2557. The radio communication interface 2555 may include the multiple BB processors 2556, as illustrated in FIG. 25. For example, the multiple BB processors 2556 may be compatible with multiple frequency bands used by the eNB 2530. Although FIG. 25 illustrates the example in which the radio communication interface 2555 includes the multiple BB processors 2556, the radio communication interface 2555 may also include a single BB processor 2556.

The connection interface 2557 is an interface for connecting the base station apparatus 2550 (radio communication interface 2555) to the RRH 2560. The connection interface 2557 may also be a communication module for communication in the above-described high speed line that connects the base station apparatus 2550 (radio communication interface 2555) to the RRH 2560.

The RRH 2560 includes a connection interface 2561 mend a radio communication interface 2563.

The connection interface 2561 is an interface for connecting the RRH 2560 (radio communication interface 2563) to the base station apparatus 2550. The connection interface 2561 may also be a communication module for communication in the above-described high speed line.

The radio communication interface 2563 transmits and receives radio signals via the antenna 2540. The radio communication interface 2563 may typically include, for example, the RF circuit 2564. The RF circuit 2564 may include, for example, a mixer, a filter, and an amplifier, and transmits and receives radio signals via the antenna 2540. The radio communication interface 2563 may include multiple RF circuits 2564, as illustrated in FIG. 25. For example, the multiple RF circuits 2564 may support multiple antenna elements. Although FIG. 25 illustrates the example in which the radio communication interface 2563 includes the multiple RF circuits 2564, the radio communication interface 2563 may also include a single RF circuit 2564.

In the eNB 2400 and the eNB 2530 illustrated in FIGS. 24 and 25, the processing circuit 1710, and the request processing unit 1711 and the searching unit 1712 thereof described by using FIG. 17 may be implemented by the controller 2421 and the controller 2551, the communication unit 1720 described by using FIG. 17 may be implemented by the radio communication interface 2425 and the radio communication interface 2555 and/or the radio communication interface 2563. At least a part of the functions may also be implemented by the controller 2421 and the controller 2551. For example, the controller 2421 and/or the controller 2551 can perform the functions of request processing, searching a beamforming information table, generating a notification, and processing the reported result of the beam training by executing an instruction stored in the corresponding memory.

Figure 26:
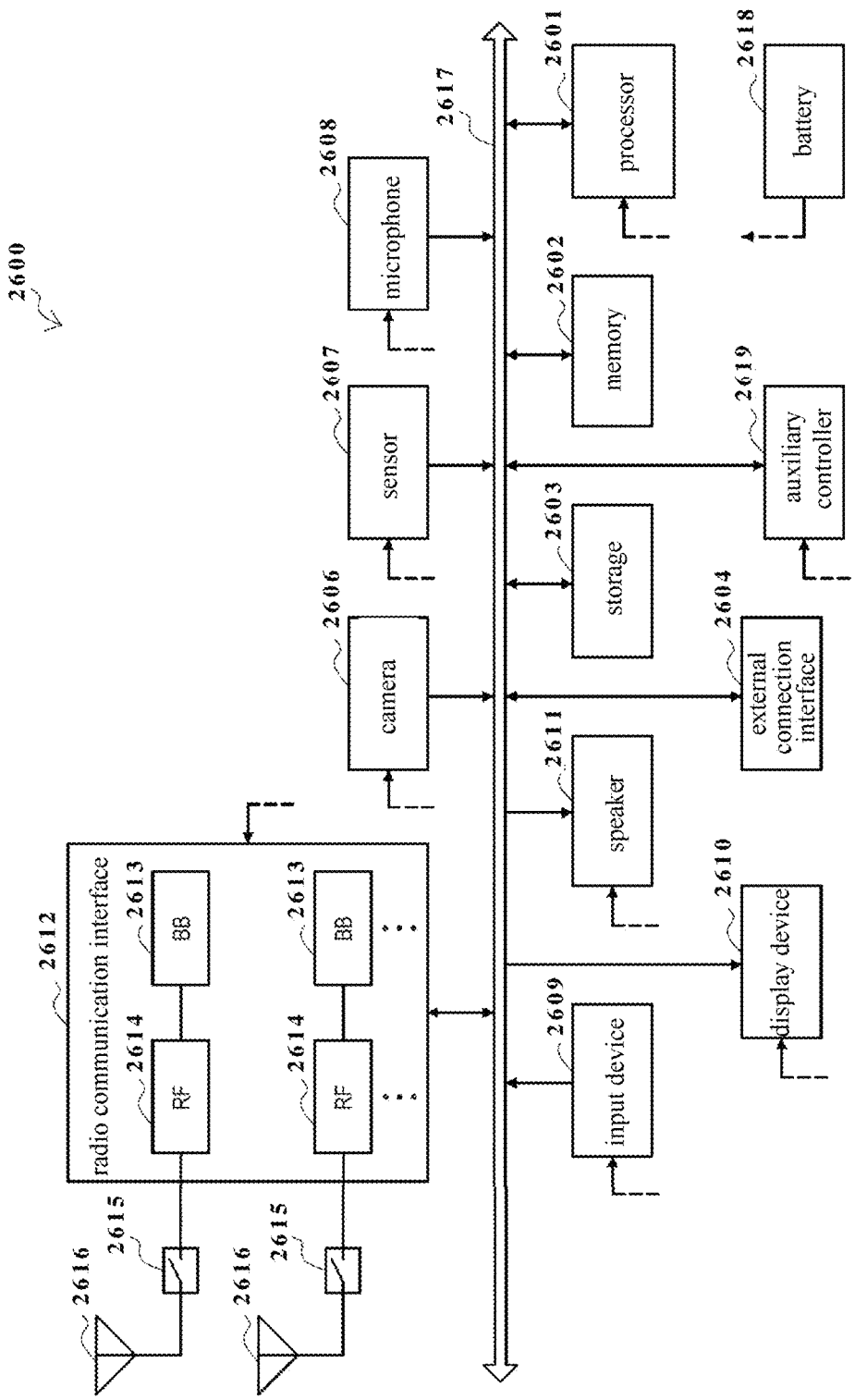
FIG. 26 is a block diagram illustrating an example of a schematic configuration of a smartphone which is applied to the present disclosure.

FIG. 26 is a block diagram illustrating an example of a schematic configuration of a smartphone 2600 to which the technology of the present disclosure may be applied. The smartphone 2600 includes a processor 2601, a memory 2602, a storage 2603, an external connection interface 2604, a camera 2606, a sensor 2607, a microphone 2608, an input device 2609, a display device 2610, a speaker 2611, a radio communication interface 2612, one or more antenna switches 2615, one or more antennas 2616, a bus 2617, a battery 2618, and an auxiliary controller 2619.

The processor 2601 may be, for example, a CPU or a system on a chip (SoC), and controls functions of an application layer and another layer of the smartphone 2600. The memory 2602 includes RAM and ROM, and stores a program that is executed by the processor 2601, and data. The storage 2603 may include a storage medium such as a semiconductor memory and a hard disk. The external connection interface 2604 is an interface for connecting an external device (such as a memory card and a universal serial bus (USB) device) to the smartphone 2600.

The camera 2606 includes an image sensor (such as a charge coupled device (CCD) and a complementary metal oxide semiconductor (CMOS)), and generates a captured image. The sensor 2607 may include a group of sensors such as a measurement sensor, a gyro sensor, a geomagnetic sensor, and an acceleration sensor. The microphone 2608 converts sounds that are input to the smartphone 2600 to audio signals. The input device 2609 includes, for example, a touch sensor configured to detect touch on a screen of the display device 2610, a keypad, a keyboard, a button, or a switch, and receives an operation or an information input from a user. The display device 2610 includes a screen (such as a liquid crystal display (LCD) and an organic light-emitting diode (OLED) display), and displays an output image of the smartphone 2600. The speaker 2611 converts audio signals that are output from the smartphone 2600 to sounds.

The radio communication interface 2612 supports any cellular communication scheme (such as LET and LIE-Advanced), and performs radio communication. The radio communication interface 2612 may typically include, for example, a BB processor 2613 and an RF circuit 2614. The BB processor 2613 may perform, for example, encoding/decoding, modulating/demodulating, and multiplexing/demultiplexing, and performs various types of signal processing for radio communication. Meanwhile, the RF circuit 2614 may include, for example, a mixer, a filter, and an amplifier, and transmits and receives radio signals via the antenna 2616. The radio communication interface 2612 may be a chip module having the BB processor 2613 and the RF circuit 2614 integrated thereon. The radio communication interface 2612 may include the multiple BB processors 2613 and the multiple RF circuits 2614, as illustrated in FIG. 26. Although FIG. 26 illustrates the example in which the radio communication interface 2612 includes the multiple BB processors 2613 and the multiple RF circuits 2614, the radio communication interface 2612 may also include a single BB processor 2613 or a single RF circuit 2614.

Furthermore, in addition to a cellular communication scheme, the radio communication interface 2612 may support another type of radio communication scheme such as a short-distance wireless communication scheme, a near field communication scheme, and a radio local area network (LAN) scheme. In that case, the radio communication interface 2612 may include the BB processor 2613 and the RF circuit 2614 for each radio communication scheme.

Each of the antenna switches 2615 switches connection destinations of the antennas 2616 among multiple circuits (such as circuits for different radio communication schemes) included in the radio communication interface 2612.

Each of the antennas 2616 includes a single or multiple antenna elements (such as multiple antenna elements included in an MIMO antenna), and is used for the radio communication interface 2612 to transmit and receive radio signals. The smartphone 2600 may include the multiple antennas 2616, as illustrated in FIG. 26. Although FIG. 26 illustrates the example in which the smartphone 2600 includes the multiple antennas 2616, the smartphone 2600 may also include a single antenna 2616.

Furthermore, the smartphone 2600 may include the antenna 2616 for each radio communication scheme. In that case, the antenna switches 2615 may be omitted from the configuration of the smartphone 2600.

The bus 2617 connects the processor 2601, the memory 2602, the storage 2603, the external connection interface 2604, the camera 2606, the sensor 2607, the microphone 2608, the input device 2609, the display device 2610, the speaker 2611, the radio communication interface 2612, and the auxiliary controller 2619 to each other. The battery 2618 supplies power to blocks of the smartphone 2600 illustrated in FIG. 26 via feeder lines, which are partially shown as dashed lines in the figure. The auxiliary controller 2619 operates a minimum necessary function of the smartphone 2600, for example, in a sleep mode.

In the smartphone 2600 illustrated in FIG. 26, the processing circuit 210, and the requesting unit 211, the beam training unit 212 and the storage unit 213 thereof described by using FIG. 2, the beamforming unit 214 and the data transmission unit 215 described in FIG. 7, the processing circuit 1310, and the beaming training unit 1311 and the storage unit 1312 thereof described in FIG. 13, and the beamforming unit 1313 and the data transmission unit 1314 described in FIG. 14 may be implemented by the processor 2601 or the auxiliary controller 2619. The communication unit 220 described by using FIG. 2 and the communication unit 1320 described in FIG. 13 may be implemented by the radio communication interface 2612. At least a part of the functions may also be implemented by the processor 2601 or the auxiliary controller 2619. For example, the processor 2601 or the auxiliary controller 2619 can perform the functions of generating a beamforming information request, triggering a beam training process and generating the result of the beam training by executing an instruction stored in the memory 2602 and the storage 2603.

Figure 27:
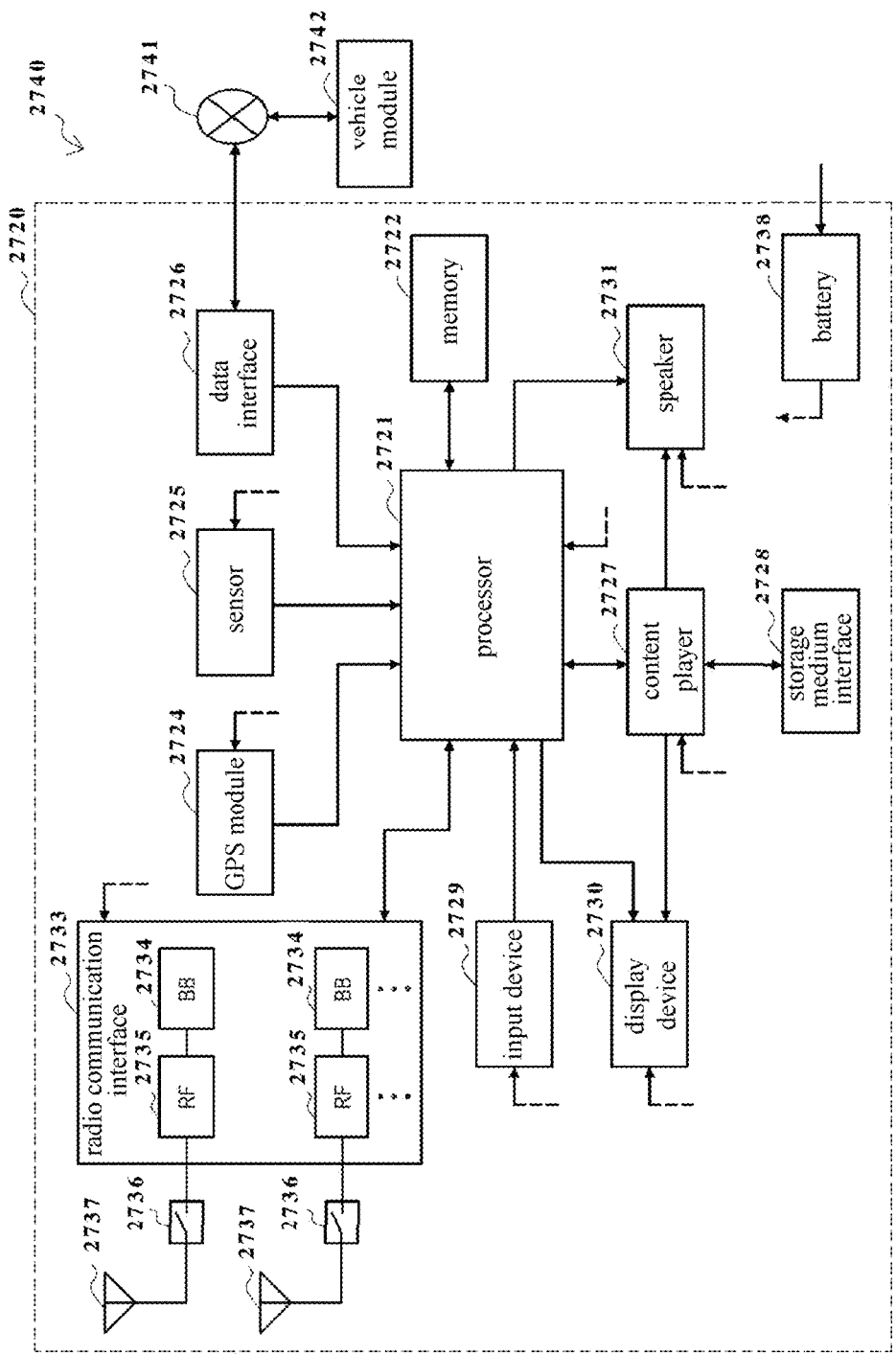
FIG. 27 is a block diagram illustrating an example of a schematic configuration of a car navigation device which is applied to the present disclosure.

FIG. 27 is a block diagram illustrating an example of a schematic configuration of a car navigation apparatus 2720 to which the technology of the present disclosure may be applied. The car navigation apparatus 2720 includes a processor 2721, a memory 2722, a global positioning system (GPS) module 2724, a sensor 2725, a data interface 2726, a content player 2727, a storage medium interface 2728, an input device 2729, a display device 2730, a speaker 2731, a radio communication interface 2733, one or more antenna switches 2736, one or more antennas 2737, and a battery 2738.

The processor 2721 may be, for example, a CPU or a SoC, and controls a navigation function and another function of the car navigation apparatus 2720. The memory 2722 includes RAM and ROM, and stores a program that is executed by the processor 2721, and data.

The GPS module 2724 uses GPS signals received from a GPS satellite to measure a position (such as latitude, longitude, and altitude) of the car navigation apparatus 2720. The sensor 2725 may include a group of sensors such as a gyro sensor, a geomagnetic sensor, and an air pressure sensor. The data interface 2726 is connected to, for example, an in-vehicle network 2741 via a terminal that is not shown, and acquires data (such as vehicle speed data) generated by the vehicle.

The content player 2727 reproduces content stored in a storage medium (such as a CD and a DVD) that is inserted into the storage medium interface 2728. The input device 2729 includes, for example, a touch sensor configured to detect touch on a screen of the display device 2730, a button, or a switch, and receives an operation or an information input from a user. The display device 2730 includes a screen such as a LCD or an OLED display, and displays an image of the navigation function or content that is reproduced. The speaker 2731 outputs sounds of the navigation function or the content that is reproduced.

The radio communication interface 2733 supports any cellular communication scheme (such as LTE and LTE-Advanced), and performs radio communication. The radio communication interface 2733 may typically include, for example, a BB processor 2734 and an RF circuit 2735. The BB processor 2734 may perform, for example, encoding/decoding, modulating/demodulating, and multiplexing/demultiplexing, and performs various types of signal processing for radio communication. Meanwhile, the RF circuit 2735 may include, for example, a mixer, a filter, and an amplifier, and transmits and receives radio signals via the antenna 2737. The radio communication interface 2733 may also be a chip module that has the BB processor 2734 and the RF circuit 2735 integrated thereon. The radio communication interface 2733 may include the multiple BB processors 2734 and the multiple RF circuits 2735, as illustrated in FIG. 27. Although FIG. 27 illustrates the example in which the radio communication interface 2733 includes the multiple BB processors 2734 and the multiple RF circuits 2735, the radio communication interface 2733 may also include a single BB processor 2734 or a single RF circuit 2735.

Furthermore, in addition to a cellular communication scheme, the radio communication interface 2733 may support another type of radio communication scheme such as a short-distance wireless communication scheme, a near field communication scheme, and a radio LAN scheme. In that case, the radio communication interface 2733 may include the BB processor 2734 and the RF circuit 2735 for each radio communication scheme.

Each of the antenna switches 2736 switches connection destinations of the antennas 2737 among multiple circuits (such as circuits for different radio communication schemes) included in the radio communication interface 2733.

Each of the antennas 2737 includes a single or multiple antenna elements (such as multiple antenna elements included in an MIMO antenna), and is used for the radio communication interface 2733 to transmit and receive radio signals. The car navigation apparatus 2720 may include the multiple antennas 2737, as illustrated in FIG. 27. Although FIG. 27 illustrates the example in which the ear navigation apparatus 2720 includes the multiple antennas 2737, the car navigation apparatus 2720 may also include a single antenna 2737.

Furthermore, the car navigation apparatus 2720 may include the antenna 2737 for each radio communication scheme. In that case, the antenna switches 2736 may be omitted from the configuration of the car navigation apparatus 2720.

The battery 2738 supplies power to blocks of the car navigation apparatus 2720 illustrated in FIG. 27 via feeder lines that are partially shown as dashed lines in the figure. The battery 2738 accumulates power supplied form the vehicle.

In the car navigation apparatus 2720 illustrated in FIG. 27, the processing circuit described by using FIG. 2, and the requesting unit 211, the beam training unit 212, and the storage unit 213 thereof, the beamforming unit 214 and the data transmission unit 215 described in FIG. 7, the processing circuit 1310, and the beam training unit 1311 and the storage unit 1312 thereof described in FIG. 13, and the beamforming unit 1313 and data transmission unit 1314 described in FIG. 14 may be implemented by processor 2721, and the communication unit 220 described by using FIG. 2 and the communication unit 1320 described by using FIG. 13 may be implemented by the wireless communication interface 2733. At least a part of the functions may also be implemented by the processor 2721. For example, the processor 2721 can perform the functions of generating a beamforming information request, triggering a beam training process, and generating a result of beam training by executing an instruction stored in the memory 2722.

The technology of the present disclosure may also be realized as an in-vehicle system (or a vehicle) 2740 including one or more blocks of the car navigation apparatus 2720, the in-vehicle network 2741, and a vehicle module 2742. The vehicle module 2742 generates vehicle data (such as vehicle speed, engine speed, and trouble information), and outputs the generated data to the in-vehicle network 2741.

In the system and method according to the present disclosure, it is obvious that the various components or steps may be decomposed and/or recombined. These decompositions and/or recombinations should be considered as equivalents to the present disclosure. Also, the steps of performing the above-described series of processing may naturally be performed in chronological order in the order illustrated, but need not necessarily be performed in chronological order. Certain steps may be performed in parallel or independently of one another.

The embodiments of the present disclosure have been described in detail above with reference to the drawings. However, it should be understood that the above described embodiments are merely illustrative of the present disclosure and do not limit the present disclosure. Those skilled in the art can make various modifications and changes to the above embodiments without departing from the spirit and scope of the present disclosure. Therefore, the scope of the present disclosure is defined only by the appended claims and their equivalents.

The invention claimed is:

1. An electronic device in a wireless communication system which serves as a transmitter device for device-to-device D2D communication, the electronic device comprising:
   a transceiver; and
   one or more processing circuits configured to:
   cause the transceiver to request beamforming information from a server in the wireless communication system based on position information of the electronic device and a receiver device corresponding to the electronic device;

trigger a beam training process between the electronic device and the receiver device when the electronic device does not acquire the beamforming information from the server;

cause the transceiver to report a result of the beam training process to the server after the beam training process ends;

perform a beamforming process based on the result of the beam training process; and perform data transmission with the receiver device based on the result of the beamforming process.

2. The electronic device according to claim 1, wherein when performing the beam training process, the processing circuit is further configured to:

cause the transceiver to transmit a training sequence to the receiver device;

cause the transceiver to receive a training sequence transmitted from the receiver device after the training sequence is transmitted to the receiver device each time; and store a beam obtained from the training, and causing the transceiver to transmit a training sequence to the receiver device using the stored beam after the training sequence transmitted from the receiver device is received each time.

3. The electronic device according to claim 2, wherein when causing the transceiver to transmit the training sequence to the receiver device using the stored beam, the processing circuit is further configured to:

cause the transceiver to transmit the training sequence and data together to the receiver device using the stored beam.

4. The electronic device according to claim 2, wherein the processing circuit is further configured to:

cause the transceiver to report all the stored beams to the server;

determine that an optimal beam between the electronic device and the receiver device is blocked;

select a sub-optimal beam to re-perform a beamforming process;

cause the transceiver to transmit a beam change request to the receiver device to request the receiver device to select the sub-optimal beam to re-perform a beamforming process; and perform data transmission with the receiver device based on a result of re-performed beamforming process.

5. The electronic device according to claim 4, wherein processing circuit is further configured to:

determine that the optimal beam between the electronic device and the receiver device is restored;

select the optimal beam to re-perform a beamforming process;

cause the transceiver to transmit a beam change request to the receiver device to request the receiver device to select the optimal beam to re-perform a beamforming process; and perform data transmission with the receiver device based on a result of the re-performed beamforming process.

6. An electronic device in a wireless communication system which serves as a receiver device for device-to-device D2D communication, the electronic device comprising:

a transceiver; and one or more processing circuits configured to:

perform a beam training process between the electronic device and a transmitter device corresponding to the electronic device which is triggered by the transmitter device;

cause the transceiver to report a result of the beam training process to a server in the wireless communication system after the beam training process ends;

perform a beamforming process based on the result of the beam training process; and perform data transmission with the transmitter device based on the result of the beamforming process, wherein the transmitter device requests beamforming information from the server based on position information of the electronic device and the transmitter device, and triggers the beam training process when the transmitter device does not acquire the beamforming information from the server.

7. The electronic device according to claim 6, wherein when performing the beam training process, the processing circuit is further configured to:

cause the transceiver to receive a training sequence transmitted from the transmitter device;

store a beam obtained from the training, and causing the transceiver to transmit a training sequence to the transmitter device using the stored beam after the training sequence transmitted from the transmitter device is received each time;

cause the transceiver to receive the training sequence transmitted from the transmitter device after the training sequence is transmitted to the transmitter device each time; and report all the stored beams to the server.

8. The electronic device according to claim 7, wherein when causing the transceiver to transmit the training sequence to the transmitter device using the stored beam, the processing circuit is further configured to:

cause the transceiver to transmit a training sequence and data together to the transmitter device using the stored beam.

9. The electronic device according to claim 6, wherein the processing circuit is further configured to:

determine that an optimal beam between the electronic device and the transmitter device is blocked;

select a sub-optimal beam to re-perform a beamforming process;

cause the transceiver to transmit a beam change request to the transmitter device, to request the transmitter device to select the sub-optimal beam to re-perform a beamforming process; and perform data transmission with the transmitter device based on a result of the re-performed beamforming process.

10. The electronic device according to claim 9, wherein the processing circuit is further configured to:

determine that the direct path between the electronic device and the transmitter device is restored;

select the optimal beam to re-perform a beamforming process;

cause the transceiver to transmit a beam change request to the transmitter device, to request the transmitter device to select the optimal beam to re-perform a beamforming process; and perform data transmission with the transmitter device based on a result of the reperformed beamforming process.

11. A server in a wireless communication system, comprising:
a transceiver; and
one or more processing circuits configured to:
cause the transceiver to receive a beamforming information request transmitted by a transmitter device for performing device-to-device D2D communication in the wireless communication system based on position information of the transmitter device and a receiver device corresponding to the transmitter device;
search a beamforming information table based on the position information of the transmitter device and the receiver device;
when the beamforming information does not exist in the beamforming information table, causing the transceiver to notify the transmitter device such that the transmitter device triggers a beam training process between the transmitter device and the receiver device;
cause the transceiver to receive a result of the beam training process from the transmitter device and storing it in the beamforming information table;
cause the transceiver to receive a result of the beam training process from the receiver device and storing it in the beamforming information table; and
when the beamforming information exists in the beamforming information table, cause the transceiver to transmit the beamforming information to the transmitter device and the receiver device.

12. The server according to claim 11, wherein when causing the transceiver to receive the result of the beam training process from the transmitter device and the receiver device and storing it in the beamforming information table, the processing circuit is further configured to:
cause the transceiver to receive an optimal beam and a sub-optimal beam from the transmitter device;
cause the transceiver to receive the optimal beam and the sub-optimal beam from the receiver device; and
store the optimal beams and the sub-optimal beams received from the transmitter device and the receiver device as beamforming information corresponding to position information of the transmitter device and the receiver device.

13. The server according to claim 11, wherein the processing circuit is further configured to:
set a survival period for beamforming information in the beamforming information table; and
delete beamforming information that exceeds the survival period.

14. A wireless communication method performed by a transmitter device for performing device-to-device D2D communication in a wireless communication system, comprising:
requesting beamforming information from a server in the wireless communication system based on position information of the transmitter device and a receiver device corresponding to the transmitter device;
triggering a beam training process between the transmitter device and the receiver device when the beamforming information is not acquired from the server;
reporting a result of the beam training process to the server after the beam training process ends;
performing a beamforming process based on the result of the beam training process; and
performing data transmission with the receiver device based on the result of the beamforming process.

15. A wireless communication method performed by a receiver device for performing device-to-device D2D communication in a wireless communication system, comprising:
performing a beam training process between the receiver device and a transmitter device corresponding to the receiver device which is triggered by the transmitter device;
reporting a result of the beam training process to a server in the wireless communication system after the beam training process ends;
performing a beamforming process based on the result of the beam training process; and
performing data transmission with the transmitter device based on the result of the beamforming process,
wherein the transmitter device requests beamforming information from the server based on position information of the transmitter device and the receiver device, and triggers the beam training process when the transmitter device does not acquire the beamforming information from the server.

16. A wireless communication method, comprising:
receiving a beamforming information request transmitted by a transmitter device for performing device-to-device D2D communication in the wireless communication system based on position information of the transmitter device and a receiver device corresponding to the transmitter device;
searching a beamforming information table based on the position information of the transmitter device and the receiver device;
when the beamforming information does not exist in the beamforming information table, notifying the transmitter device such that the transmitter device triggers a beam training process between the transmitter device and the receiver device;
receiving a result of the beam training process from the transmitter device and storing it in the beamforming information table; and
when the beamforming information exists in the beamforming information table, causing the transceiver to transmit the beamforming information to the transmitter device and the receiver device.

\* \* \* \* \*